US009297467B1

(12) United States Patent
    Goseco

(10) Patent No.: US 9,297,467 B1
(45) Date of Patent: Mar. 29, 2016

(54) FLUID LEAK DETECTOR APPARATUS

(71) Applicant: John O. Goseco, Costa Mesa, CA (US)

(72) Inventor: John O. Goseco, Costa Mesa, CA (US)

( * ) Notice: Subject to any disclaimer, the term of this patent is extended or adjusted under 35 U.S.C. 154(b) by 0 days.

(21) Appl. No.: 13/999,181

(22) Filed: Jan. 23, 2014

(51) Int. Cl.
    *F16K 31/48* (2006.01)
    *F16K 17/36* (2006.01)

(52) U.S. Cl.
    CPC .......... *F16K 17/36* (2013.01); *Y10T 137/7761* (2015.04); *Y10T 137/86389* (2015.04)

(58) Field of Classification Search
    CPC ... F16K 21/16; F16K 31/48; Y10T 137/7725; Y10T 137/7727; Y10T 137/7785; Y10T 137/8326; Y10T 137/2647; Y10T 137/7761; Y10T 137/2607; Y10T 137/2622; Y10T 137/264; Y10T 137/86461
    USPC ......... 137/115.24, 115.25, 116.3, 116.5, 461, 137/486, 487.5, 624.12, 624.18, 137/87.03–87.05; 251/279
    See application file for complete search history.

(56) References Cited

U.S. PATENT DOCUMENTS

| | | | |
|---|---|---|---|
| 3,464,438 A | 9/1969 | Maurer | |
| 3,542,060 A | 11/1970 | Nienhuis | |
| 3,729,051 A | 4/1973 | Mannion | |
| 4,522,221 A * | 6/1985 | Chivens et al. | 137/118.07 |
| 4,589,435 A | 5/1986 | Aldrich | |
| 4,624,280 A * | 11/1986 | DePirro | 137/392 |
| 4,724,864 A | 2/1988 | Schwelm | |
| 4,735,231 A * | 4/1988 | Jacquet | 137/459 |
| 5,004,014 A | 4/1991 | Bender | |
| 5,007,453 A * | 4/1991 | Berkowitz et al. | 137/458 |
| 5,441,070 A | 8/1995 | Thompson | |
| 5,568,825 A | 10/1996 | Faulk | |
| 5,971,011 A * | 10/1999 | Price | 137/460 |
| 6,766,835 B1 | 7/2004 | Fima | |
| 6,837,271 B1 * | 1/2005 | Saint | 137/624.12 |
| 7,050,887 B2 | 5/2006 | Alvarez | |
| 8,939,167 B2 * | 1/2015 | Mevius | 137/116.5 |
| 2002/0148515 A1 * | 10/2002 | Coffey | E03B 7/071 137/624.11 |
| 2005/0224118 A1 * | 10/2005 | Tornay | F17D 5/06 137/624.11 |
| 2006/0225796 A1 * | 10/2006 | Hendrix | 137/624.12 |
| 2009/0277516 A1 * | 11/2009 | Winkler et al. | 137/486 |
| 2011/0284781 A1 * | 11/2011 | Keller et al. | 251/129.15 |
| 2012/0291886 A1 * | 11/2012 | Rivera | 137/487.5 |

* cited by examiner

*Primary Examiner* — R. K. Arundale

(57) ABSTRACT

A leak detection apparatus which is to detect a fluid leak in a closed fluid system and produce a display of the information of the leak on a display window of a control panel which may also be programmed to transmit that information to the human user such as a cell phone. The leak detection apparatus can be located in a closed position, not permitting flow of fluid within the closed fluid system, or in an open position permitting flow of fluid into the closed fluid system. During inactivity the closed fluid system is not capable of receiving fluid from a fluid supply pipe. During activity when fluid is being normally discharged from the closed fluid system the leak detection apparatus is to receive fluid from the fluid supply pipe.

13 Claims, 17 Drawing Sheets

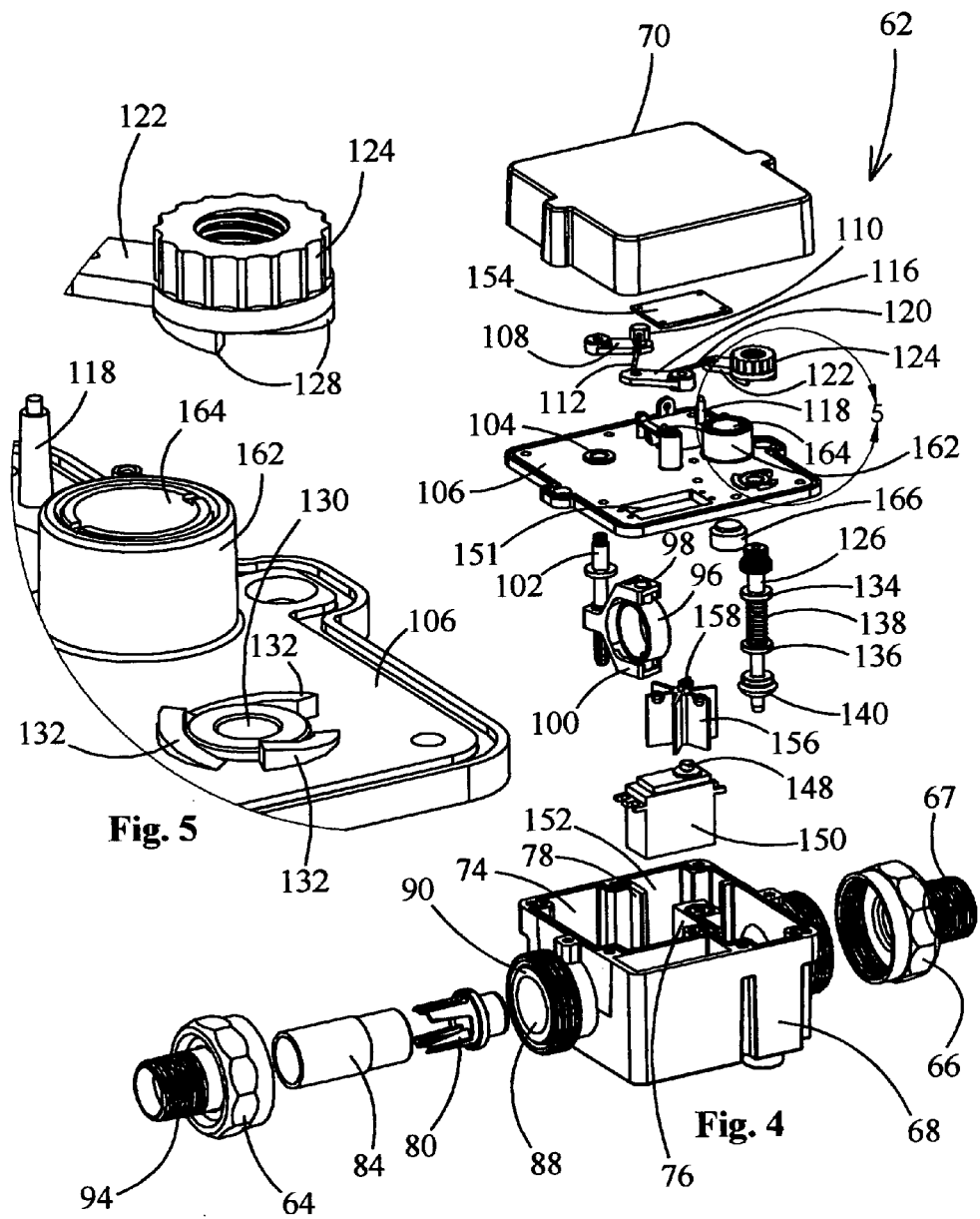

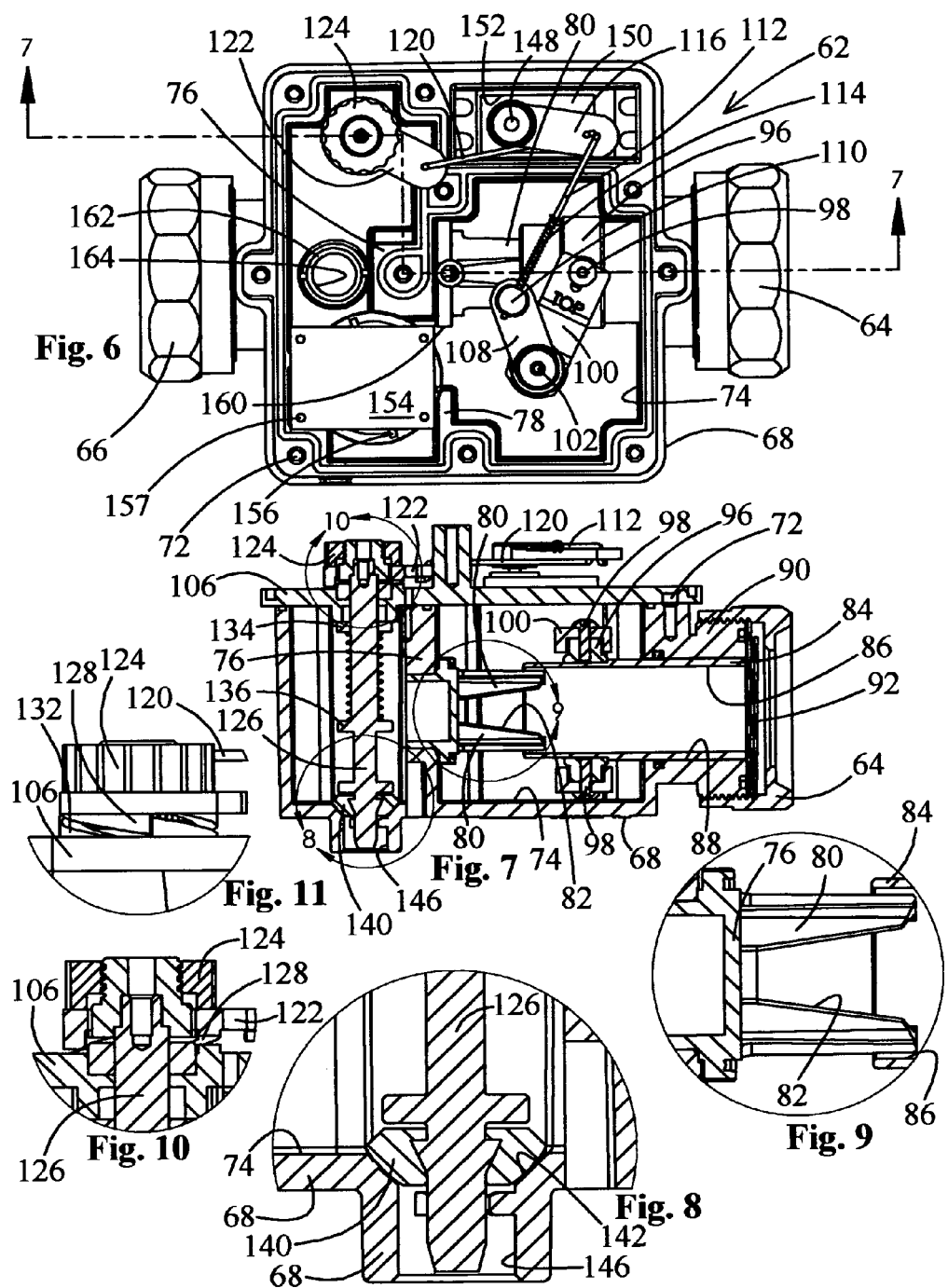

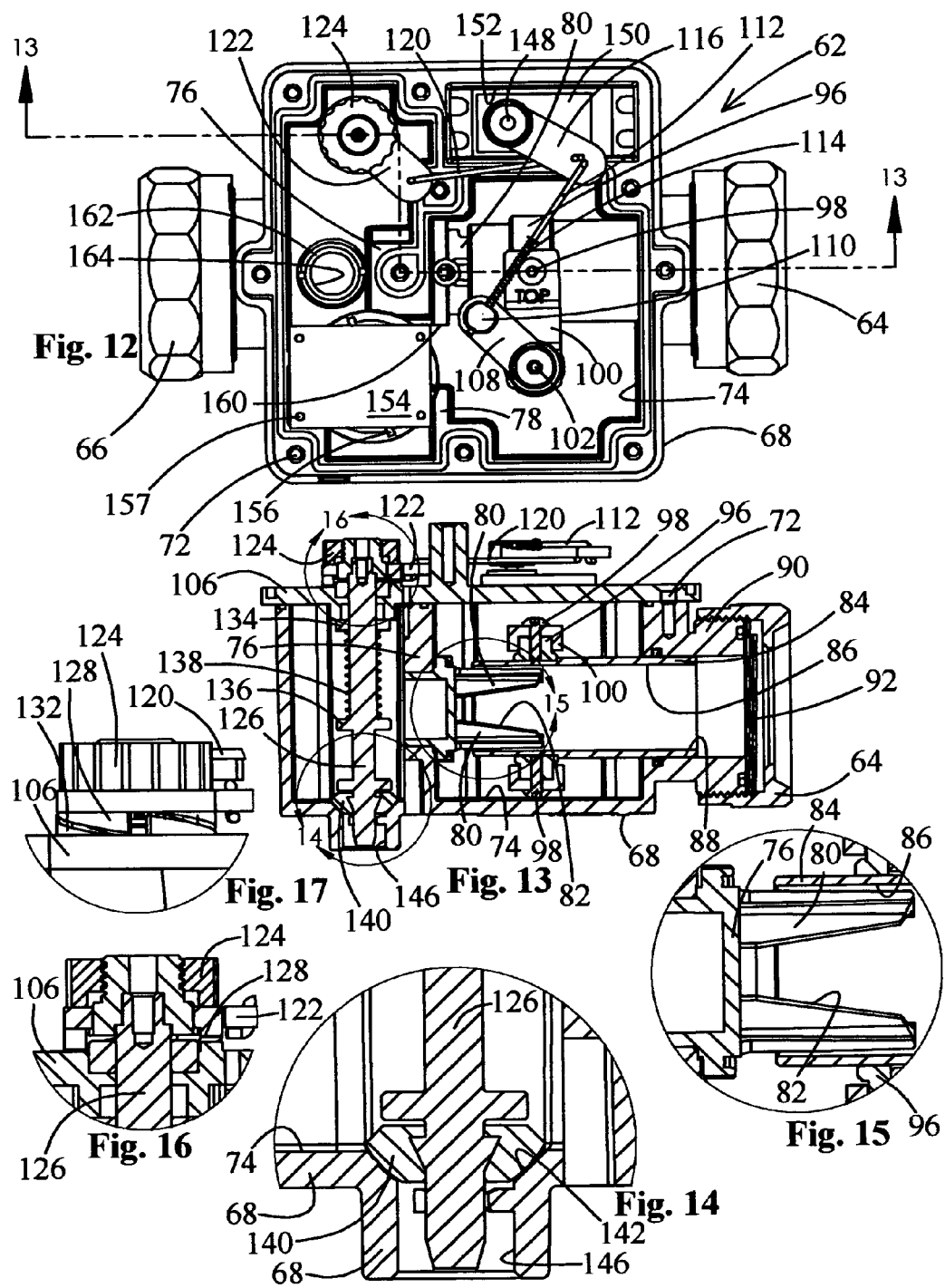

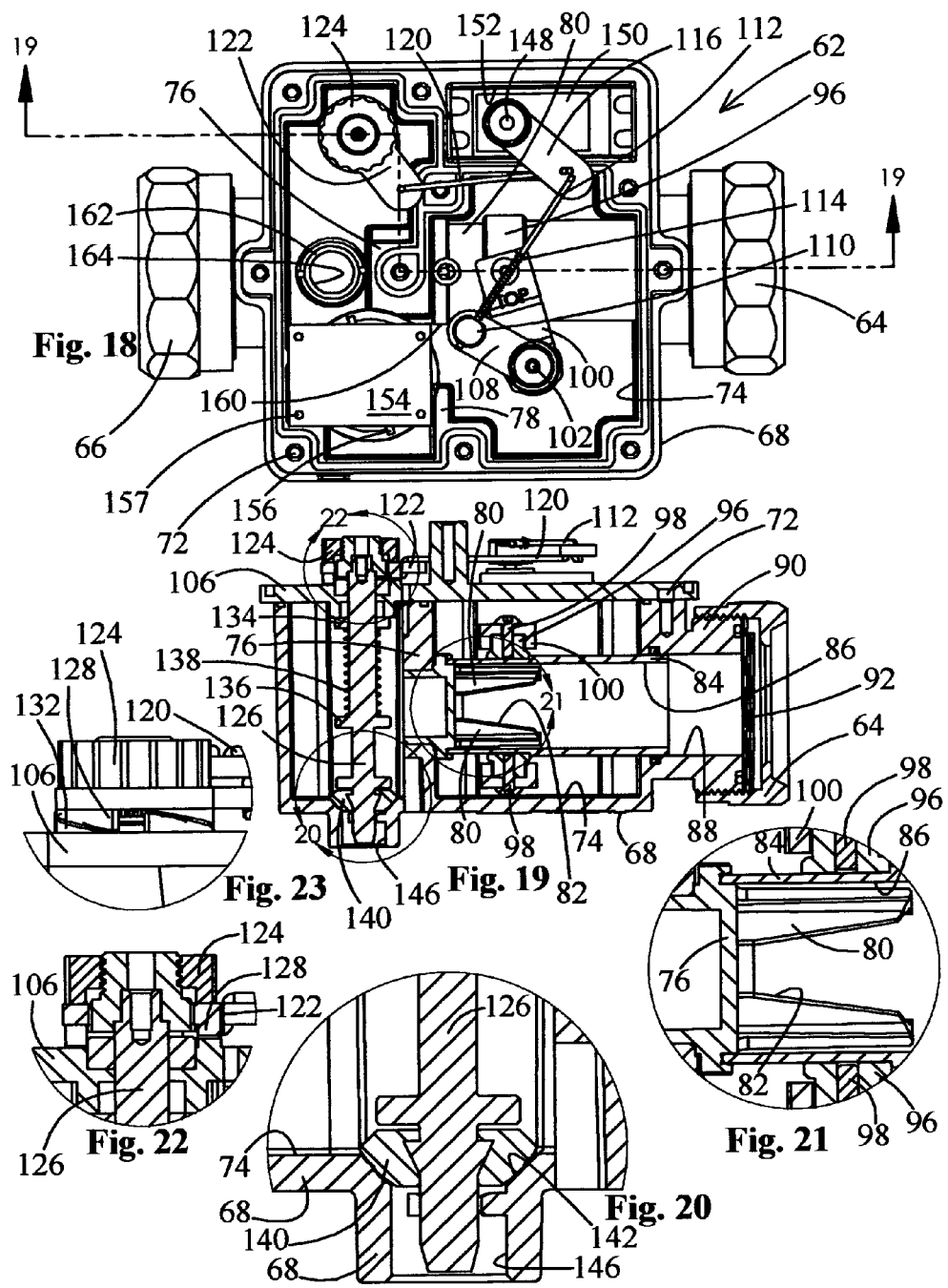

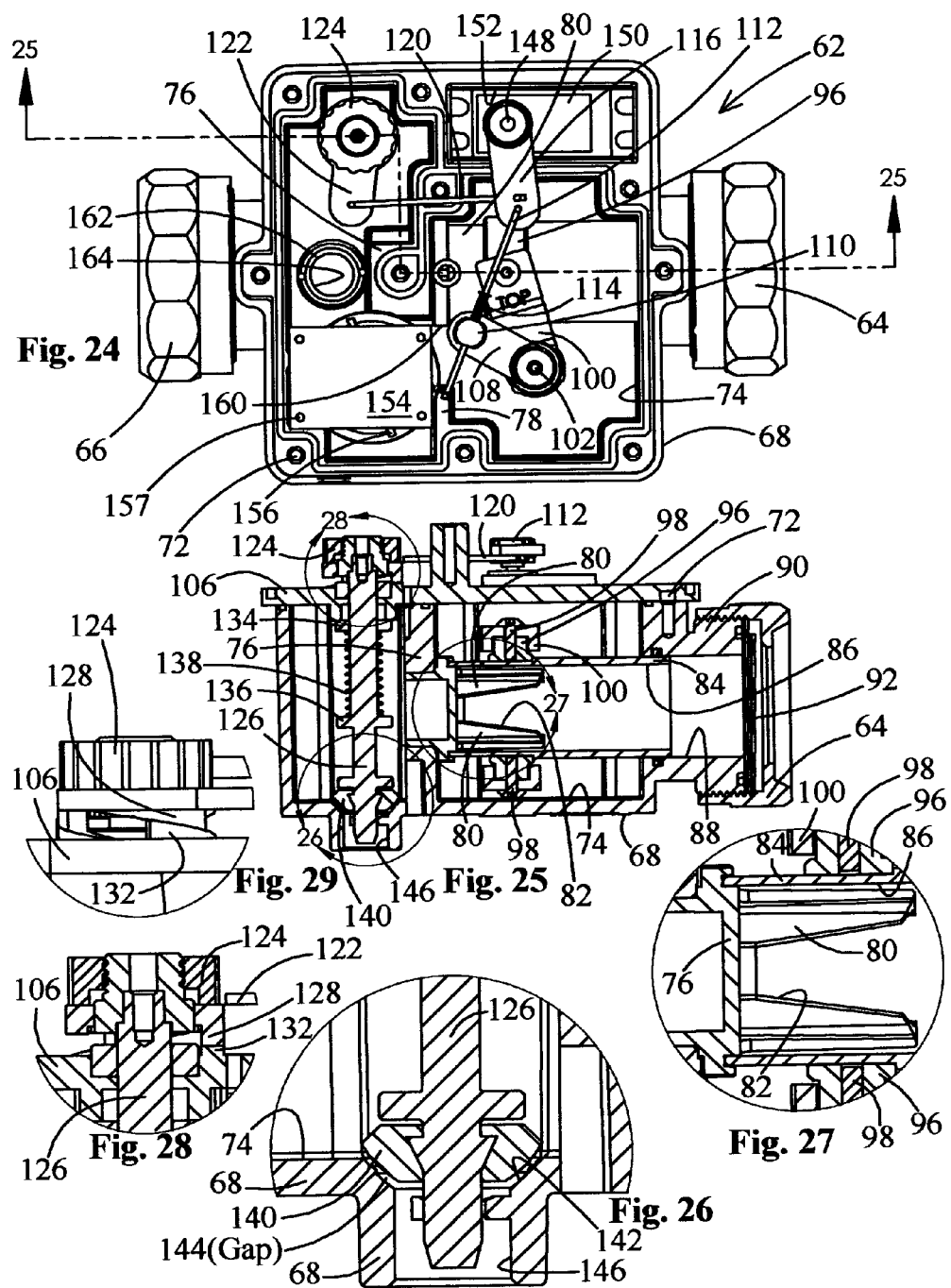

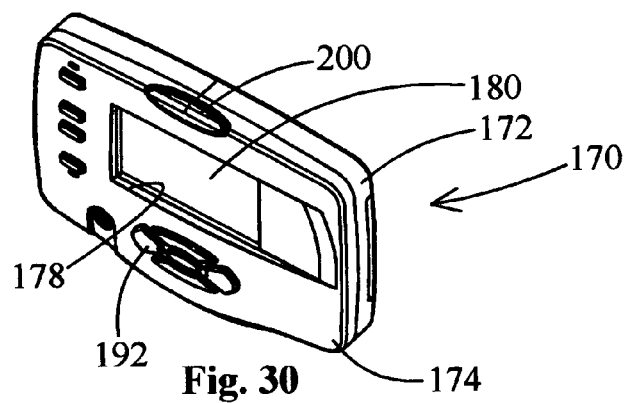
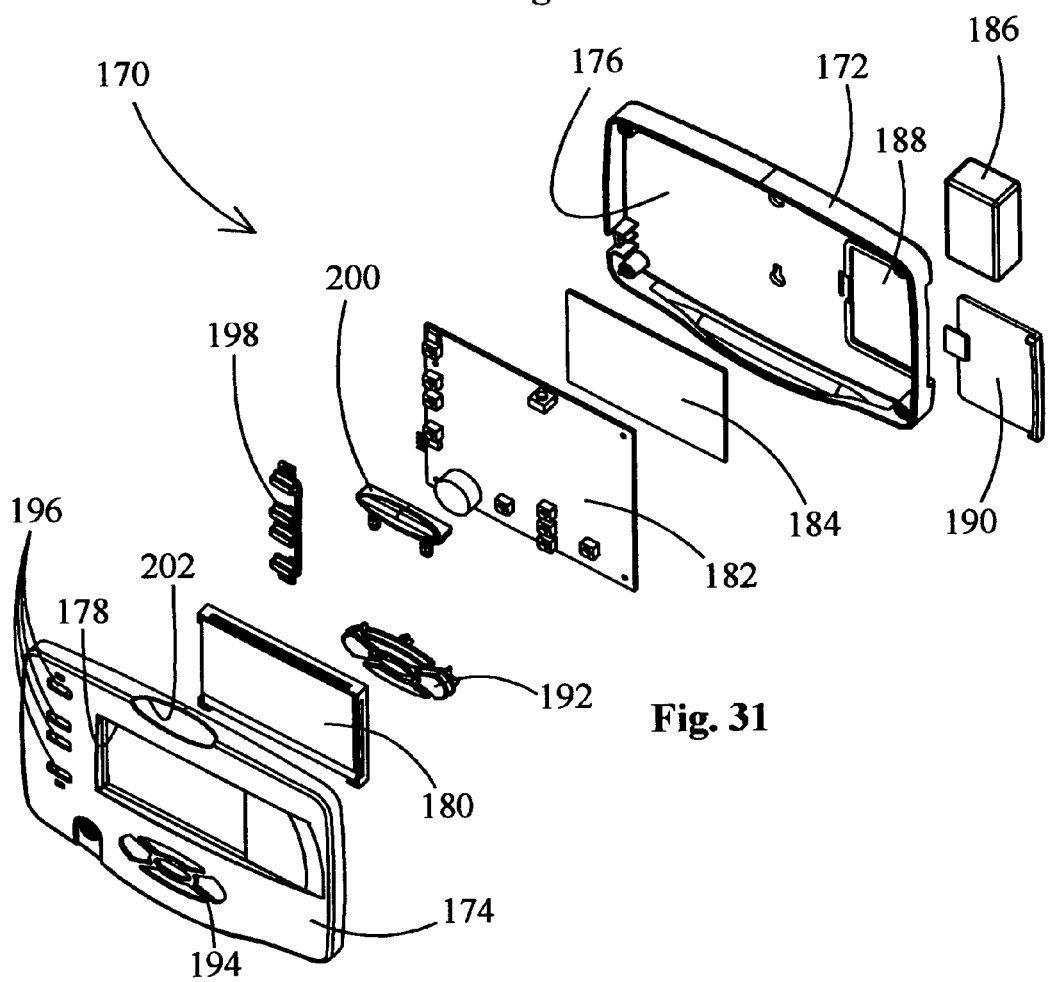

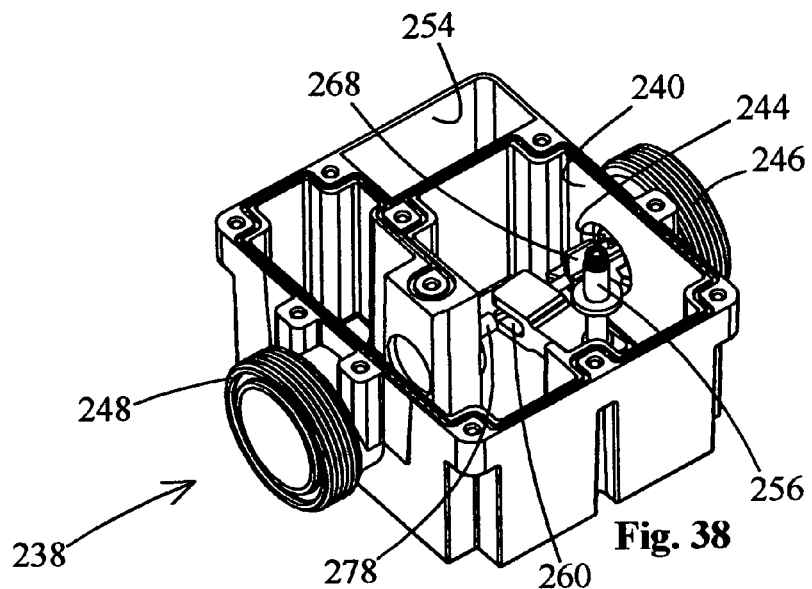
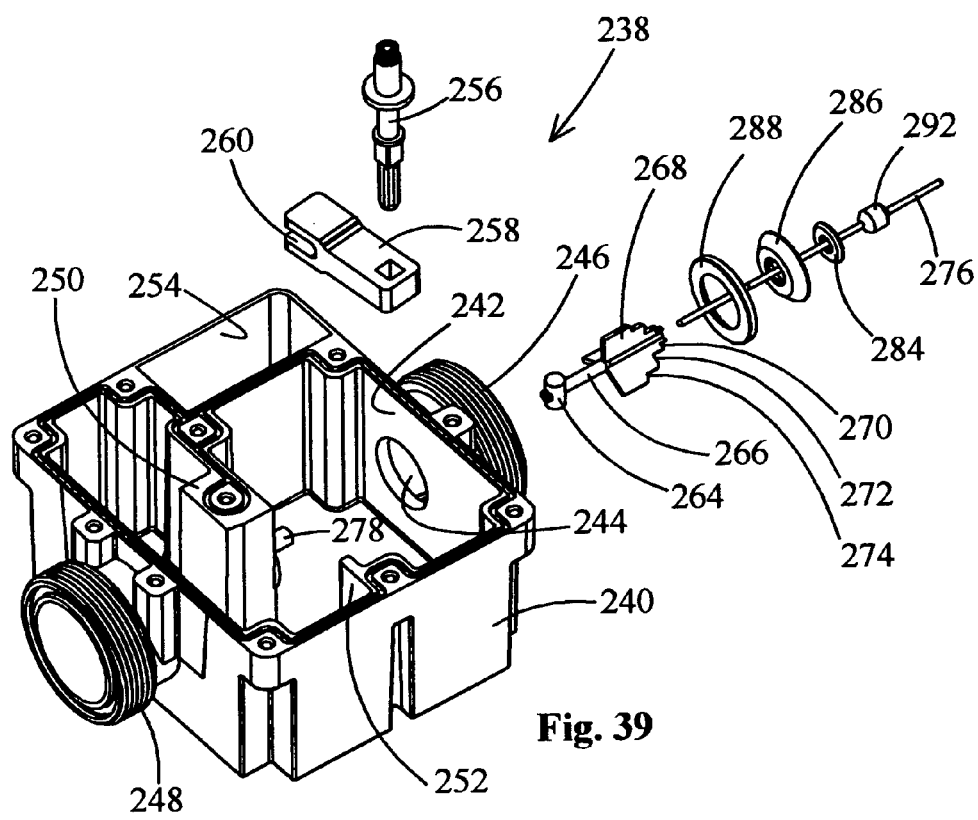

FLUID LEAK DETECTOR APPARATUS

BACKGROUND OF THE INVENTION

1. Field of the Invention

This invention pertains to a fluid leak detector apparatus and more particularly to a system that monitors and detects pressure increases and decreases in a closed fluid system for the purpose of discovering a leak.

2. Background of the Invention

The subject matter of this invention is of particular utility to a water plumbing system for a building structure such as a house or commercial building where water is conducted from a supply pipe to discharging fixtures within, on or directly adjacent the building structure. The water from the supply pipe is to be supplied to discharging fixtures such as faucets. The plumbing system will be described here as a normally closed liquid system which is pressurized but not discharging water when inactive, but which can be opened to discharge water through faucets and other fixtures during operation. Also, although this invention is described in relation to water, this invention could be used with other liquids such as bleach, oil and gasoline and even liquid foods. Also, this invention could be used with gases. Further although this invention is described in relation to a building structure, it could be used in any environment that has a closed liquid system.

A plumbing system is usually described as being open, and consists of a water supply pipe coming from a water meter into the building structure. Water is then distributed throughout the building structure through various lines to fixtures and appliances when such are operated. Normally the supply pipe is equipped with a manual shutoff valve and in some cases a water pressure reducing valve. Shutoff valves are also used throughout the building structure to control the supply to the individual fixtures and appliances. During non-usage (inactivity) the water system is completely closed, but is pressurized and open to the supply. When a leak is present, water from the supply pipe must be stopped from flowing into the building structure. If left unchecked, a leak can cause extensive damage to the structure and the furnishings. Standing water also puts the inhabitants of the structure at a risk of electric shock and other health hazards such as mold, accidental slippage and falling. Leaks can be caused by many reasons. Some more reasons beside old age of pipes and connecting lines, are burst lines caused by excessive water pressure.

High water pressure in a building structure can be caused by numerous reasons. One common reason is failure of a pressure regulator because of age and/or mineral buildup, which may enable high water pressure to enter the structure. Pressure buildup from the expansion of heated water can rupture lines. Burst lines from freezing temperatures are another common problem. Other common causes of pipe and line damage due to structure settling, and natural disasters such as earthquakes, hurricanes and tornadoes.

There is a substantial amount of prior art in this field. All of the prior art that the present inventor is aware of utilizes a shutoff valve between the structure and the supply line that is normally open. If a leak is detected and continues for a period of time, the valve will close. Opening of the valve is to occur by the human user after repair of the leak. The disadvantage of these prior art systems is that all leaks are permitted to run for a long period of time before closure of the valve. Sometimes this can result in substantial damage to the building structure. If most leaks could be detected immediately, then minimal damage would occur to the building structure.

SUMMARY OF THE INVENTION

The leak detector apparatus of this invention is designed to primarily protect building structures from unexpected high water pressures that are in some cases the cause of broken pipes, lines and fixtures that subsequently cause water damage in homes and other buildings. It will also protect the structure from the abuse of water hammer effect and in some circumstances, replace or operate in tandem with an existing water pressure regulator. In addition to the additional safety aspect of preventing electric shocks from standing water due to accidental leaks, the system also enables substantial water conservation and monetary savings through the active use of water flow/pressure control with the advanced software of the electronic monitoring system and the additional benefit of preventing excessive water damage by limiting the amount of water flowing into the structure once a leak does occur by shutting off the water supply and thus indirectly conserving water.

The fluid leak detector apparatus of this invention consists of two major components:

A. An electronic control package that can be operated wirelessly and an electronic control board which also can be upgraded to perform many additional features by simply inserting other circuit boards into built-in connection ports.

B. A regulator which contains a fluid control valve, a bleed valve, a pressure sensor and a flow measuring device. The assembly can be used in conjunction with conventional shutoff valves and pressure regulators.

The apparatus has a pressure sensor that monitors water pressure continuously and is designed to detect even the smallest fluctuations in pressure and send electronic signals to the main circuit board in the controller when pressure variances are detected. The flow control valve is designed to be normally in the closed position (the default position) and opens to allow water flow when energized. Since the valve is normally in the closed position, the plumbing system is always isolated and protected from outside pressures in the supply. It is this unique feature that prevents exposure to excessive pressures that are often times the reason for pipe, connecting lines and fixtures to fail within a structure and cause flooding of the structure and possible monetary losses.

When the water pressure in the building structure liquid supply system on which the apparatus of this invention has been installed is stable and at a preset level, the valve will remain closed. If the pressure sensor detects a very slow pressure drop over a certain amount of time, the electronic circuitry keeps the valve closed and sends an alarm alerting the human user that a very small leak is detected somewhere in the supply system. Supply systems can experience multiple small leaks for many reasons and many go undetected for long periods of time because the amount of water is usually small and in places not easily detected. When parts age such can sometimes fail over an extended period of time. Major insurance companies disclose that in the United States building owners suffer losses of $15 billion dollars annually to "dry rot" which is caused by these small leaks. Water leaks are not just caused by high pressures that rupture pipes. Since there is no situation where a plumbing component gets better with age, every part of a plumbing system is a potential source for a leak. When a leak is detected, it is important to limit the amount of water that continues to leak. Sometimes a fitting or a connecting line behind a wall will drip such a small amount of water that it can go undetected for long periods of time, months and even years. Flow meters and switches that are used in existing prior systems cannot always pick up these small drips. Water waste, higher water bills and mold come from the neglect of these small drips. The apparatus of this invention will be useful to detect these undesirable situations.

Pressure drops cannot be missed and will show up in a short amount of time. Only when the sensor included within the regulator of this invention detects a sudden drop of 7 psi or more does the electronics quickly open the flow control valve and simultaneously activate the timer to start the countdown for a preprogrammed amount of time. Any duration of desired time can be entered into the timer and if the user wishes, this value of 7 psi can be increased or increased. Large amounts of water are wasted during bathing time in the United States because not only do users take long showers but most shower fixtures do not allow for flow control only temperature control. The apparatus of this invention will allow the user to custom tailor their usage by adjusting water flow with the water flow control valve. This inventive system active control feature can adjust water flow in any preprogrammed schedule to lower the use of water over the same amount of time. The system has a "2 minute warning" feature that can actually be set for any amount of time. It notifies the user when the timer is down to 2 minutes before shutoff. Many users of various prior art water leak detection devices complain that they are often deprived of water at the wrong time. When the "2 minute warning" time is reached the system closes the flow control valve until the water pressure reads 15 psi for 3 seconds and then restores it to the preset level. This is ample time for the user to recognize the drop in flow and if desired, reset the timer by simply turning off the water for a brief moment to allow the pressure to rise. When the pressure sensor sees the increase in pressure back to within plus or minus 4 psi of the preset level within a window of time, the timer is reset thereby continuing desirable water flow.

Water pressure spikes are a common occurrence in all parts of the United States and not just a problem for hilly communities. Pressure spikes are most often caused by a circumstance where a large volume of water is moving quickly through a broken main line in the street or down a hill then stopped abruptly. This "water hammer" effect can cause pressure spikes that can exceed 150 psi. This is a common cause of ruptured pipes and homeowners are never aware that the problem exists. If while the flow control valve is open and water pressure increases past the preset level, the system will signal the flow control valve to adjust its position to decrease flow and reduce pressure to a preset amount. If this cannot be accomplished successfully, the flow control valve closes and the bleed valve opens until pressure is down to the safe preset level. If the flow control valve is in the closed position and the pressure sensor detects an increase in pressure beyond the preset level, a common occurrence for this would be if a building structure has a pressure regulator installed on the supply pipe and a water heater is heating cold water, the system will open the flow control valve first to bleed pressure back into the supply side of the valve body. One of the main problems with conventional water pressure regulators is that such do not allow the high built-up pressures from the water heater to escape back to an area of lower pressure. Conventional regulators function like one-way valves. When cold water enters a water heater it expands when heated and pressure rises. Pressure continues to rise until the water is fully heated or hot water is discharged. These pressures can reach over 100 psi. Some building structures are equipped with hot water accumulation tanks just for this reason and such are a plentiful source of water leaks when these tanks fail. The apparatus of this invention will be extremely useful in preventing this situation.

The system of this invention has other self-diagnostic features beyond those already mentioned. At any time the user wishes, the system can be programmed to complete a self-diagnostic test. This is a very advantageous feature that prior art leak detection systems lack. The user can program the system to run the test to verify that the system is working correctly at any time throughout the day. By opening the bleed valve while the flow control valve is in the closed position, the system will look at the pressure sensor to see a rapid pressure drop. If after this event, the pressure remains unchanged, the system will conclude that the bleed valve did not open and send the appropriate alert. If the sensor only sees a small fluctuation in pressure, the system will conclude that the bleed valve did in fact open but that the flow control valve is not completely closed and send an alert to that effect. If the pressure does indeed quickly drop, the flow control valve will remain closed and the bleed valve will also close. The system will keep the valves closed for a short time to verify a complete seal of the flow control valve then open the valve until pressure is restored. It will then close the valve and signal "system OK". These features are clear advantages of the system over all others because not only does this allow for self-diagnostics, but this allows the flow control valve and bleed valves to be exercised daily to prevent sediment buildup and binding of the moving parts. The common prior art "always open" systems cannot offer this level of safety and reliability.

Another clear advantage of this invention is the "timeout period", during which flow control can be adjusted to enable uninterrupted flow without triggering a leak detection. There are times in every household where consumption of an unusually large amount of water will occur. In the morning when multiple people are getting ready for the day and at night when everyone is cleaning up before bed are common such times. High usage may also occur when house guests are present. A large party would be another time of high usage and when the "timeout period" would be utilized. If the regulator is installed on the water inlet pipe before the split to the yard irrigation system, the system will monitor and supply water during the time when the irrigation valves are open, which watering times can be identified as "timeout periods". When the "timeout period" is programmed with a "time slot", the system will deactivate the timer during this period. If during this "timeout period" the system sees the appropriate sudden pressure drop of 7 psi while the valve is closed, the system will open the flow control valve and keep it open during the "timeout period". If the optional zoning feature is utilized, the timeout feature can be programmed for the individual zones within the building or structure as well. The system also has a home/away mode. This feature allows the operator to program different timer durations for the home model (when people are present) which usually has a longer timeout period, and the away model (when people are not present), which usually will have a very short timeout period. The user can simplify this timeout feature with automatic switching between the away mode and the home mode with the addition of a motion detector as a trigger source. This is another advantage of this apparatus.

The system has an automatic high pressure freeze protection circuit that uses the bleed valve to discharge water to prevent the pipes and connecting lines from swelling and bursting if the temperature drops below a set level. In many parts of the United States a major cause of water damage comes from burst pipes and lines due to freezing. Many times, a cold front will catch a homeowner by surprise or when a property is unoccupied as in the case of a vacation home or simply when on a trip. Power outages that cause loss of heating are another common cause of frozen pipes. When power is restored and heating resume after a freeze, water leaks are expected. It should be noted that this feature will not always allow all the water to be evacuated from the plumbing system and there might be residual water in the lines. If the building structure is equipped with a hot water recirculation system, the electronics in the control module can activate this system automatically and pump hot water throughout the plumbing system or open a yard irrigation valve as well to bleed out water.

In view of the above disclosure, the primary function of this invention is to regulate water pressure and flow automatically. It will protect the plumbing and related fixtures in all building structures in which it is installed from excessive pressures by isolating the building structure from high pressure fluctuations caused by outside suppliers and prevent failures. It will also help prevent excessive water damage when these items fail. In addition, the system can help prevent damage from over flooding caused by toilets, showers, tubs, washing machines, sinks and other appliances. The electronic control board has been equipped with a "panic button" (manual override button) that when depressed, quickly closes the flow control valve thus preventing additional flooding and damage. When a user experiences a leak while occupying the property, in prior art systems or when there is no system installed, the occupier must quickly find the manual pipe supply shutoff valve and close it. This is sometimes not an easy or quick task. The "panic button" is another clear advantage from prior art systems. A manual override lever could be added to open the flow control valve if desired. A back-up power supply could be added to enable operation during a power outage.

In addition, the system of this invention could be tied into existing security and home automation systems and using an optional chip and circuit board allow the system to expand as a standalone system usable by an emergency agency. This invention also has the capability of directly controlling yard irrigation equipment. The apparatus can watch existing yard irrigation systems to verify that the water supply was used for the designated period of time.

BRIEF DESCRIPTION OF THE DRAWINGS

FIG. 4 is an exploded and rotated isometric view of the regulator showing the internal components of a first embodiment of flow control valve of FIG. 2;

FIG. 5 is an enlarged view of a portion of the exploded view of FIG. 4 denoted by the detail view line 5 in FIG. 4;

FIG. 6 is a top plan view of the exterior of the regulator of FIG. 2 showing the position of the internal components when the flow control valve is fully open and the bleed valve is closed which is the normal usage position for the water flow to occur in the building structure;

FIG. 7 is a cross-sectional view taken along section line 7-7 of the fully open flow control valve and closed bleed valve of FIG. 6;

FIG. 8 is an enlarged view of the closed bleed valve detail denoted by the corresponding detail view line 8 in FIG. 7;

FIG. 9 is an enlarged view of the flow control valve detail denoted by the corresponding detail view line 9 in FIG. 7;

FIG. 10 is an enlarged view of an upper end of the closed bleed valve shaft detail denoted by the corresponding detail view line 10 of FIG. 7;

FIG. 11 is an elevation side view of the upper end of the closed bleed valve shaft structure shown in FIGS. 6, 7 and 10;

FIG. 12 is a view similar to FIG. 6 but where the flow control valve is in the partially open position and the bleed valve is closed so the regulator functions as a conventional pressure regulator;

FIG. 13 is a cross-sectional view taken along section line 13-13 of the partially open flow control valve and closed bleed valve of FIG. 12;

FIG. 14 is an enlarged view of the closed bleed valve detail denoted by the corresponding detail view line of FIG. 13;

FIG. 15 is an enlarged view of the partially open flow control valve detail denoted by the corresponding detail view line of FIG. 13;

FIG. 16 is an enlarged view of the upper end of the closed bleed valve shaft detail denoted by the corresponding detail view line of FIG. 13;

FIG. 17 is an elevation side view of the upper end of the closed bleed valve shaft structure shown in FIGS. 12, 13, and 16;

FIG. 18 is a view similar to FIG. 6 but where the flow control valve is in the fully closed position and the bleed valve is also closed and there is no usage of water within the building structure;

FIG. 19 is a cross-sectional view taken along section line 19-19 of closed flow control and bleed valves of FIG. 18;

FIG. 20 is an enlarged view of the closed bleed valve detail denoted by the corresponding detail view line of FIG. 19;

FIG. 21 is an enlarged view of the closed flow control valve detail denoted by the corresponding detail view line of FIG. 19;

FIG. 22 is an enlarged view of the upper end of the closed bleed valve shaft detail denoted by the corresponding detail view line of FIG. 19;

FIG. 23 is an elevation side view of the upper end of the closed bleed valve structure shown in FIGS. 18, 19, and 22;

FIG. 24 is a top plan view similar to FIG. 6 but where the flow control valve is in the fully closed position and the bleed valve is open which would be the position of the regulator to diminish leak flow and eliminate high water pressure within the building structure;

FIG. 25 is a cross-sectional view taken along section line 25-25 of the closed flow control valve and the open bleed valve of FIG. 24;

FIG. 26 is an enlarged view of the open bleed valve detail denoted by the corresponding detail view line of FIG. 25;

FIG. 27 is an enlarged view of the closed flow control valve detail denoted by the corresponding detail view line of FIG. 25;

FIG. 28 is an enlarged view of the upper end of the open bleed valve shaft detail denoted by the corresponding detail view line of FIG. 25;

FIG. 29 is an elevation side view of the upper end of the open bleed valve shaft structure shown in FIGS. 24, 25, and 28;

FIG. 30 is an isometric exterior view of a thermostat control unit that is to be used in conjunction with this invention;

FIG. 31 is an exploded isometric view of the internal components of the thermostat control unit of FIG. 30;

FIG. 38 is a top isometric interior view of the regulator showing a second embodiment of flow control valve of this invention with various components removed for illustration purposes;

FIG. 39 is an exploded isometric view of the flow control valve shown in FIG. 38;

DETAILED DESCRIPTION OF THE INVENTION

The subject matter of this invention is being discussed in relation to water. However, it is envisioned that this invention could also be used with other liquids as well as gases.

Figure 1:
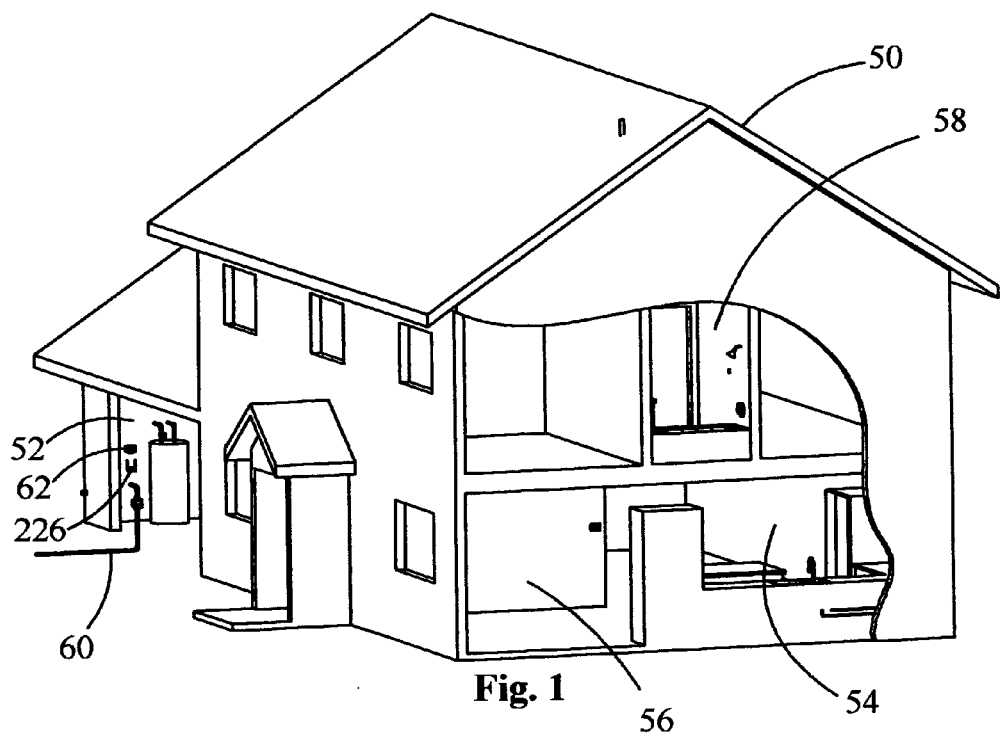
FIG. 1 is an overall schematic view showing a building structure within which is mounted the apparatus of this invention.
Figure 2:
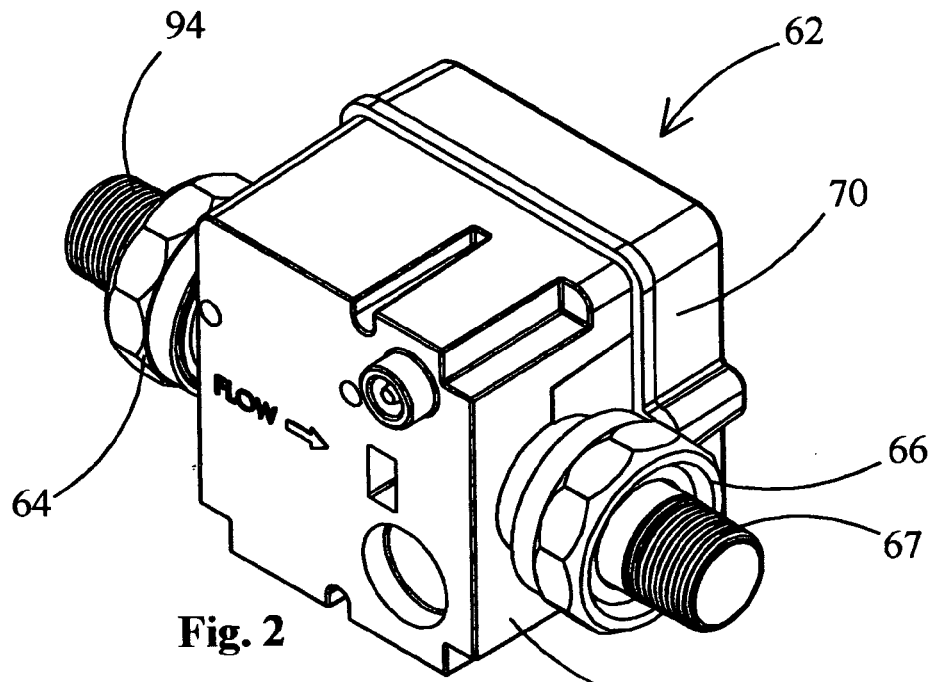
FIG. 2 is an enlarged isometric front view of the regulator used within this invention.
Figure 3:
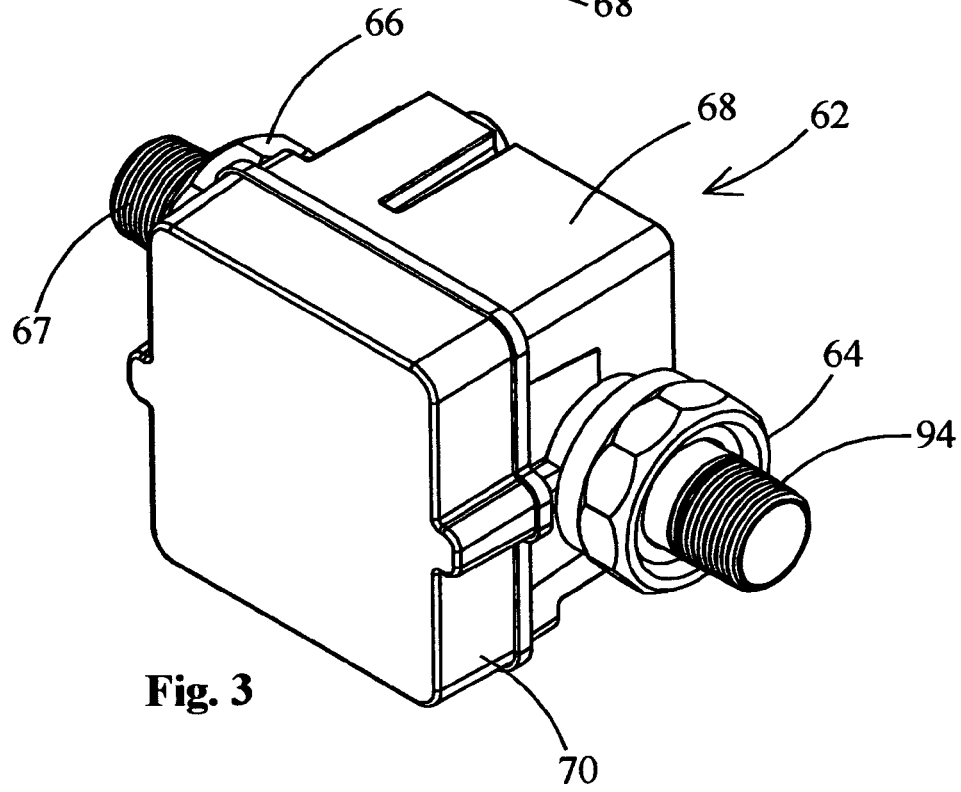
FIG. 3 is an exterior rear isometric view of the regulator of FIG. 2.

Referring particularly to FIG. 1 there is shown a building structure 50 which has a garage 52, a kitchen 54, a front room 56 and an upstairs area 58. A water supply pipe 60 is to supply water to the various outlets (not shown) located within the building structure 50 through a series of connecting lines. In the garage 52 there is to be installed within the water supply pipe 60 the regulator 62 of this invention. The regulator 62 is a first embodiment of this invention. The water supply pipe 60 is to connect to regulator 62 by nipple 94 and fitting 64. A water outlet line (not shown) is to supply water to the various fixtures and appliances within the building structure 50 through connecting lines (not shown) and is connected by fitting 66 and nipple 67 to the outlet line.

Regulator 62 has a housing comprised of a base 68 and a cover 70 which can normally be held together by a plurality of screws 72. Base 68 has an internal chamber 74. When cover 70 is mounted on base 68, internal chamber 74 is completely closed. Base 68 has a pair of spaced apart partition walls 76 and 78. Fixedly mounted on partition wall 76 is a piston 80. Piston 80 is constructed of a plurality of tapered prongs with a gap 82 located between each pair of directly adjacent prongs. The piston 80 could be constructed of two prongs, three prongs or four or more prongs.

Piston 80 is received in a close fitting manner with a cylinder 84. Piston 80 and cylinder 84 function as the first embodiment of flow control valve (80, 82, 84) of this invention. Cylinder 84 has a through bore 86. Cylinder 84 is slideably mounted in a close fitting manner with a through bore 88 formed within a sleeve 90. Sleeve 90 is integral with base 68. Sleeve 90 has a series of external screw threads which engage with internal screw threads formed within fitting 64. Mounted within fitting 64 is an elastomeric sealing ring 92 which functions to form a liquid tight seal between fitting 64 and sleeve 90. Fitting 64 connects with nipple 94 which in turn connects with water supply pipe 60. Water from pipe 60 is to be continuously supplied through bore 88. Cylinder 84 can be located in a totally retracted position relative to piston 80 (as shown in FIG. 7) in a "fully open" position, which will permit water to flow through gaps 82 into internal chamber 74 or in partially retracted position shown in FIG. 13, in a "partially open" position, which decreases the volume of flow into internal chamber 74 or in a totally extended and "fully closed" position, which closes gaps 82 not permitting flow into internal chamber 74 as is shown in FIG. 19. In the totally extended and fully closed position the fore edge of cylinder 84 tightly abuts against partition wall 76 not permitting flow of water into internal chamber 74.

Fixedly mounted on the cylinder 84 is a ring 96. Pivotally mounted by a pair of pins 98 on ring 96 is a yoke 100. Secured to yoke 100 is a rod 102. Rod 102 passes through hole 104 formed within lid 106. Lid 106 is fixedly mounted onto base 68 in a water tight manner. For descriptive purposes the lid 106 and cover 70 are not shown in FIGS. 6, 12, 18 and 24.

The outer end of rod 102 is pivotally connected to link 108. At the opposite end of link 108 is a protrusion 110. Protrusion 110 has a through hole through which a thin rod 112 slides therewithin. Mounted on thin rod 112 is a coil spring 114. The opposite end of thin rod 112 is pivotally connected to link 116. Link 116 is pivotally mounted to pin 118 which is fixed to lid 106. Link 116 also has a thin rod 120 pivotally mounted thereon. Thin rod 120 is also pivotally connected to link 122. Attached to link 122 is a nut 124. Nut 124 is to be threadably secured to bleed valve shaft 126. Attached to the underside of nut 124 are a series (3) of slanted ramps 128. Bleed valve shaft 126 is to pass through hole 130 formed in lid 106. Mounted on lid 106 and surrounding hole 130 are three in number of ramps 132. Each ramp 132 is to be in continuous engagement with a ramp 128.

Mounted on bleed valve shaft 126 intermediate its ends are a pair of washers 134 and 136. Washer 136 is integral with shaft 126 and washer 134 is slideable on shaft 126. In between washers 134 and 136 and mounted on shaft 126 is a coil spring 138. The lower end of shaft 126 has mounted thereon a conical washer 140. Conical washer 140 connects with seat 142. Washer 140 can be tight against seat 142 as is shown in FIGS. 8, 14 and 20 or spaced therefrom forming a circular gap 144 as is shown in FIG. 26. The lower free end of shaft 126 is located within bleed hole 146 formed in base 68, which together form a bleed valve (126, 140, 146). Hole 146 is open to the ambient.

Link 116 is attached to motor shaft 148 extending from electrical motor 150. Motor 150 rests within motor compartment 152 which is formed in base 68. The motor compartment 152 is separate from and water tight sealed from internal compartment 74. Formed in lid 106 is an access opening 151 to provide access to motor 150. The motor 150 is to be supplied electricity by wires which are not shown. Electricity is also to be supplied to circuit board 154 which is mounted on lid 106 and located between lid 106 and the inner wall surface of cover 70. Circuit board 154 has four holes each of which connect with a separate alignment pin 157 which are mounted on lid 106 which functions to hold the board 154 in position. Circuit board 154 is electrically connected by wires (not shown) to mother board 168 shown in FIG. 37.

The operation of the flow control valve within the regulator 62 is as follows. The regulator 62 is in the position shown in FIGS. 6 to 11 with the flow control valve totally open where cylinder 84 is completely retracted (FIG. 9). In this position the bleed valve (126, 140, 146) is closed by conical washer 140 being tight against seat 142 as shown in FIG. 8. Water can freely flow from supply line 60 into internal chamber 74 and out through fitting 66 to appropriate faucets and appliances located within building structure 50. This is the normal fully open water usage position.

A second position is shown in FIGS. 12 to 17 which could be preprogrammed into the electronics of mother board 168. This partially open position highly restricts water flow. Motor 150 is activated which slightly turns motor shaft 148. Link 116 pivots about twenty degrees clockwise. Link 122 is pivoted about twenty degrees counter clockwise which is not sufficient to open the bleed valve and unseat washer 140. Link 108 is also pivoted about twenty degrees clockwise which lineally moves cylinder 84 a short distance to slightly expose gap 82 (FIG. 15) and permit passage of a restricted amount of water into internal chamber 74 through fitting 66 into connecting lines mounted in building structure 50. The bleed valve (126, 140, 146) remains closed as seen in FIG. 14. The second position is used to limit water flow to a particular faucet such as a shower. Other water restrictive positions could be preprogrammed into the electronics or this restrictive position could be changed to be less restrictive.

A third position is shown in FIGS. 18 to 23. The motor is further activated pivoting link 116 clockwise an additional ten to fifteen degrees which will cause link 108 to pivot counter clockwise a similar amount. As a result the cylinder 84 will then move lineally until cylinder 84 abuts partition wall 76 preventing flow of water from the water supply line 60 into internal chamber 74. This is the fully closed position (no water flow) shown in FIG. 21. Link 122 is also pivoted similarly clockwise which turns ramps 128 relative to ramps 132. However, this movement is not sufficient to unseat conical washer 140 and no water bleeds out the bleed valve (126, 140, 146) shown in FIG. 20. No flow or usage of water occurs.

A fourth position is shown in FIGS. 24 to 29. Further activation of the motor causes further pivoting of both links 116 and 122. However, link 108 cannot pivot further so the result is thin rod 112 slides relative to link 108 and spring 114 compresses. Spring 114 will move the thin rod 112 back to the position shown in FIGS. 6, 12 and 18 when motor 150 is operated in reverse. In this position, the ramps 128 slide up their respective ramps 132 which causes bleed valve shaft 126 to retract a short distance producing gap 144 shown in FIG. 26. Water is then bled out into the ambient. This bleeding is to occur if the water pressure in the building structure 50 is above a preprogrammed value.

There may also be included within the internal chamber 74 a water flow measuring device. A typical such device is shown in FIG. 4 as paddle wheel 156. Mounted on one edge of one vane of the paddle wheel 156 is a magnet 158. There are six in number of vanes shown and there are three in number of magnets 158. However, only one magnet could be used or all of the vanes could have a magnet 158. The paddle wheel 156 is rotatably mounted at gap 160 between partition walls 76 and 78. In order for water to flow from internal chamber 74 through fitting 66 and into the connecting lines, the paddle wheel 186 must rotate. Each magnet 158 will pass by a metallic object (not shown) that is mounted on either partition wall 76 or 78. This object is a sensor connected electrically to the electronics on the mother board 168 which produces an on/off switching action which will function as a counter. The volume of water located between two directly adjacent vanes of the paddle wheel 156 is a known value and the same for the volumes between each directly adjacent pair of vanes. Therefore, as the paddle wheel turns the number of revolutions can be ascertained by the number of on/offs produced by the magnet 158 or magnets. Using this number and knowing the volume of water between each directly adjacent pair of vanes, the total volume of water flowing through gap 160 can be calculated.

Mounted on lid 106 is a raised cylinder 162. The raised cylinder has a center hole 164. The center hole 164 connects with internal chamber 74. Mounted within center hole 164 is a piezoelectric pressure sensor device 166 which is deemed to be conventional. The center hole 164 is sealed relative to the ambient. However, the pressure sensor 166 is connected by wires (not shown) to circuit board 154.

Referring particularly to FIGS. 30 and 31 there is shown the thermostat and control unit 170. Unit 170 includes a base 172 on which is mounted a cover 174 which when connected together enclose an internal chamber 176. Cover 174 has a rectangular opening 178 through which a display screen 180 is to be observable. Display screen 180 is electrically to circuit board 182. Mounted on the back of circuit board 182 is a power supply and thermostat and control board 184. A battery 186 connects to board 184. Access to battery 186 is provided through access opening 188 formed in base 172. Access opening 188 is normally closed by removable door 190.

Electrically connected to circuit board 182 is a series of direction buttons 192 which are exposed to the ambient by hole pattern 194 formed in cover 174. Also holes 196 are formed in cover 174 which connect with mode select buttons 198. Also emergency shut off button 200 is provided which connects with hole 202 formed in cover 174. Manual pushing of button 200 will cause the cylinder 84 to close thereby shutting off the water flow assuming the flow control valve is open. This button can be used by a human user to immediately shut off water flow avoiding any time delay. This control unit 170 can be programmed to function also as a thermostat control for heating and air conditioning appliances located with the building structure 50. The control unit 170 is wireless and sends signals through the air to mother board 168. Unit 170 is designed to be mounted on a wall located within building structure 50.

Figure 32:
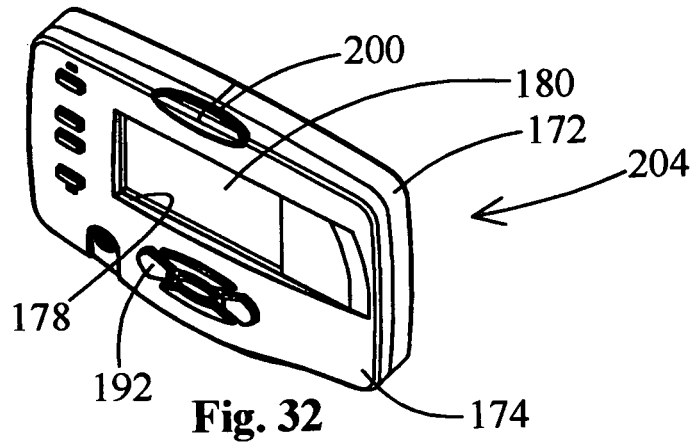
FIG. 32 is an isometric exterior view of the hard wired control unit that is to be used in conjunction with this invention.
Figure 33:
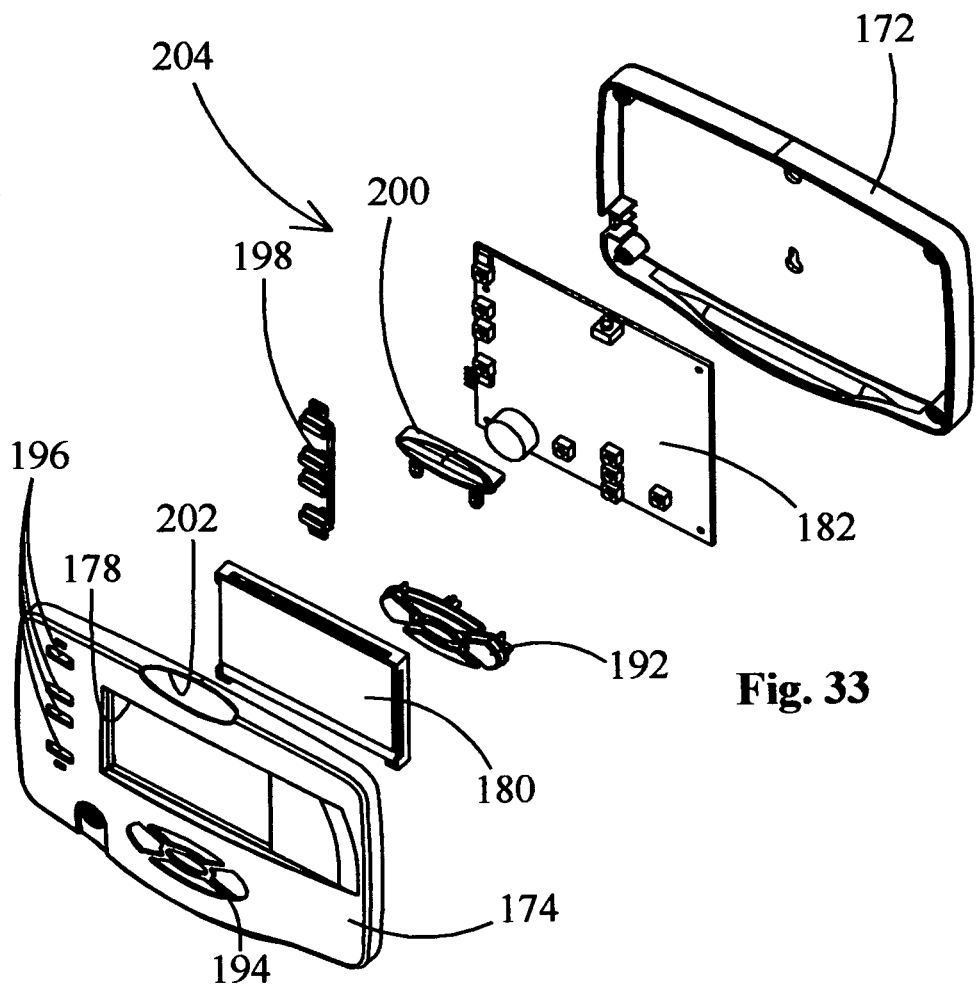
FIG. 33 is an exploded isometric view of the internal components of the hard wired control unit of FIG. 32.

In FIGS. 32 and 33 there is shown a hard wired control unit 204 which is essentially similar to control unit 170. Like numerals have been used to refer to like parts. The only difference between units 170 and 204 for purposes of illustration is that there is not shown battery 186, door 190 or power supply and thermostat and control board 184. The unit 204 is to be wired directly to mother board 168.

Figure 34:
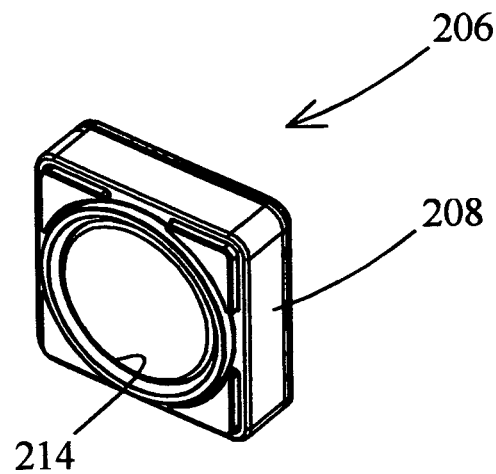
FIG. 34 is an exterior isometric view of the remote control unit that is to be used in conjunction with the first embodiment wireless unit of this invention.
Figure 35:
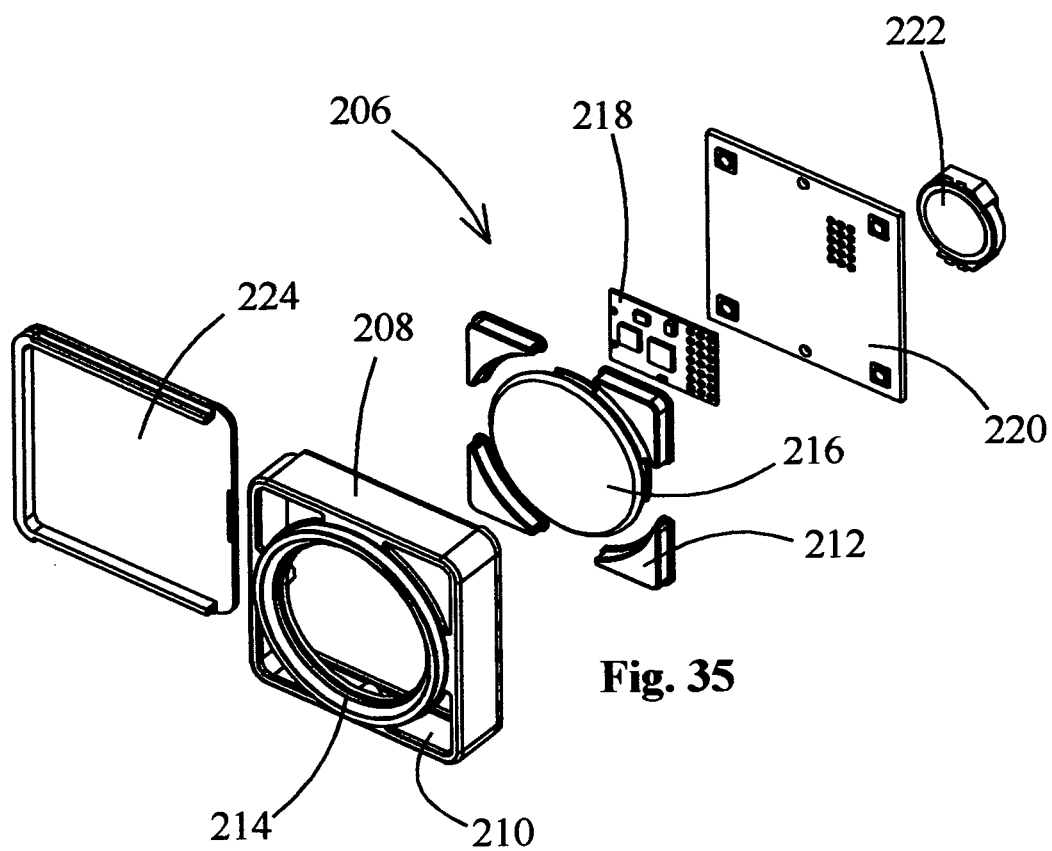
FIG. 35 is an exploded isometric view showing the internal components of the remote control unit of FIG. 34.

Referring to FIGS. 34 and 35 there is shown a wireless remote control unit 206. Unit 206 has a housing 208 which has appropriate openings 210 which connect with programmable buttons 212 (four in number). Center hole 214 connects with center light or button 216. Buttons 212 and 216 connect electrically with wireless circuit board 218 which is mounted on main circuit board 220. A battery 222 connects with circuit board 220. The rear of housing 208 is to be closed by removable door 224. The unit 206 is to be mounted on any wall in building structure 50 and usable to transmit directions to mother board 168. There may be used a multiple number of units 208 in building structure 50.

Figure 36:
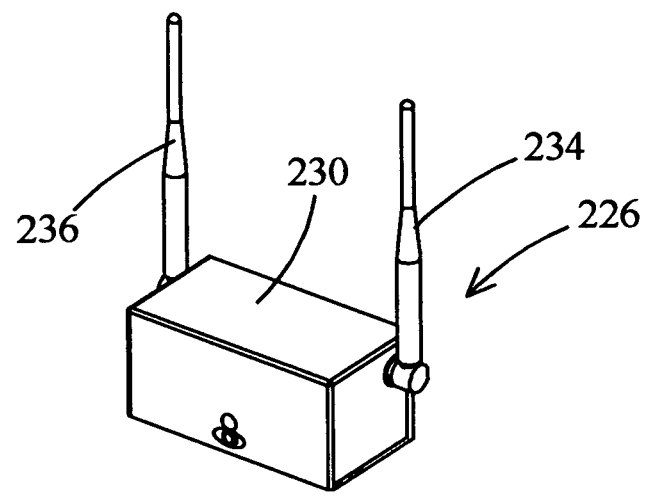
FIG. 36 is an exterior isometric view of the expansion control unit that is to be used in conjunction with this invention.
Figure 37:
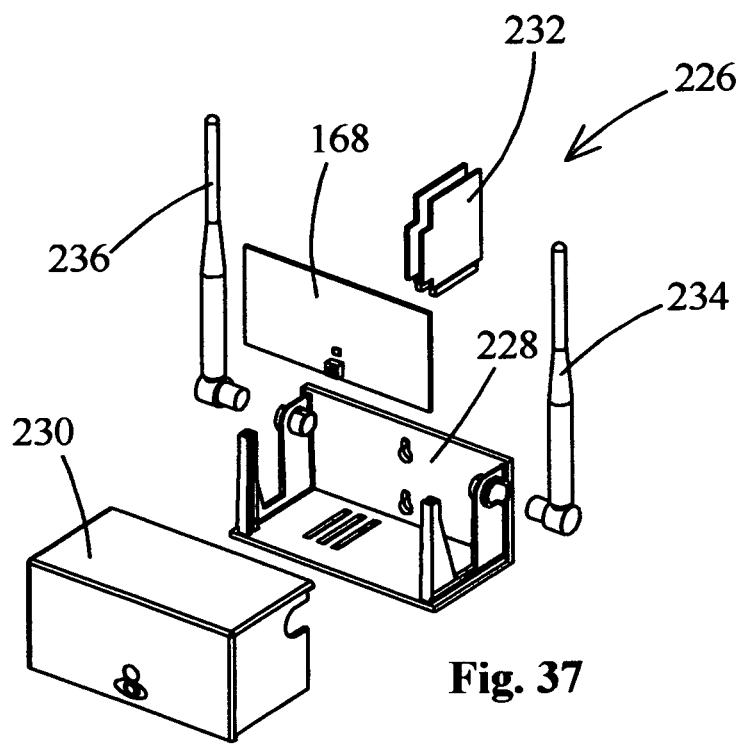
FIG. 37 is an exploded isometric view showing the internal components of the expansion control unit of FIG. 36.

There may be installed in building structure 50, as in garage 52, an expansion control unit 226 which is shown in FIGS. 36 and 37. Unit 226 has a housing composed of base 228 and cover 230. Base 228 has slots for mounting of mother circuit board 168 as well as optional daughter circuit boards 232. Antennas 234 and 236 are mounted on base 228 which are to receive wireless signals and transmit such to boards 168 and 232. The daughter boards 232 are to control electronic devices mounted in building structure 50 which are not part of the fluid leak detector apparatus of this invention.

Referring particularly to FIGS. 38 to 44 there is shown a second embodiment of flow control valve. There is a regulator 238 which is essentially similar to regulator 62. Regulator 238 has a housing 240 which is essentially similar to base 68. There will be a cover (not shown) utilized to enclose internal chamber 242, which is essentially identical to cover 70. Housing 240 has a pair of water passage openings with only opening 244 being shown. Nipple 246 connects with opening 244. The other opening connects with nipple 248. Nipple 246 is to connect with a water supply pipe (not shown) similar to water supply pipe 60. Nipple 248 connects with an outlet connecting line (not shown).

Internal chamber 242 includes partition walls 250 and 252. Between these walls there is a space within which is to be located a flow measuring device (not shown) similar to paddle wheel 156. The previously described bleed valve (126, 140, 146) is also included, and linked as described above. Located directly adjacent internal chamber 242 is a motor compartment 254 which is to be water tight sealed from internal chamber 242. A motor (not shown) is to be located within motor compartment 254. The motor has an output shaft (not shown) which is to turn by the motor. This output shaft is to connect to a linkage assembly similar to link 116, thin rod 112 and link 108. The equivalent link to link 108 is to connect to shaft 256. Shaft 256 is rotatably mounted to the housing 240. Fixedly mounted on shaft 256 is an arm 258.

The outer end of arm 258 is bifurcated forming longitudinal slot 260. Also formed in arm 258 is a transverse slot 262 which connects with longitudinal slot 260. A barrel pin 264 is mounted in transverse slot 262 and is capable of pivoting relative to arm 258. Barrel pin 264 is attached to a sleeve 266. Sleeve 266 is attached to fined or stepped actuator 268. Actuator 268 has three equiangularly spaced apart fins each of which have a step 270, a step 272 and a step 274.

A rod defined as a valve stem 276 is fixedly mounted within a sleeve 266. The outer end of stem 276 is slideably mounted within a sleeve 278. Sleeve 278 is integral with a fixed piston 280 which is fixed within a recess 282 formed in partition wall 250. Valve stem 276 passes through sleeve 266 and is movable along with arm 258. Valve stem 276 is conducted through opening 244.

Mounted on valve stem 276 are a series of disc shaped wafers 284, 286 and 288. Wafer 284 has the smallest diameter with wafer 288 having the largest diameter and wafer 286 having an intermediate diameter. Wafer 288 is capable of forming a water tight seal with wall surface 290 which is part of housing 240 and surrounds opening 244. Wafer 286 is capable of forming a water tight seal with wafer 288 and wafer 284 is capable of forming a water tight seal with wafer 286. A plug 292 is fixedly mounted on valve stem 276 and is capable of forming a water tight seal with wafer 284. The second embodiment of the flow control valve is thereby formed by the opening 244, actuator 268, stem 276, wafers 284, 286, 288, and plug 292.

Figure 40:
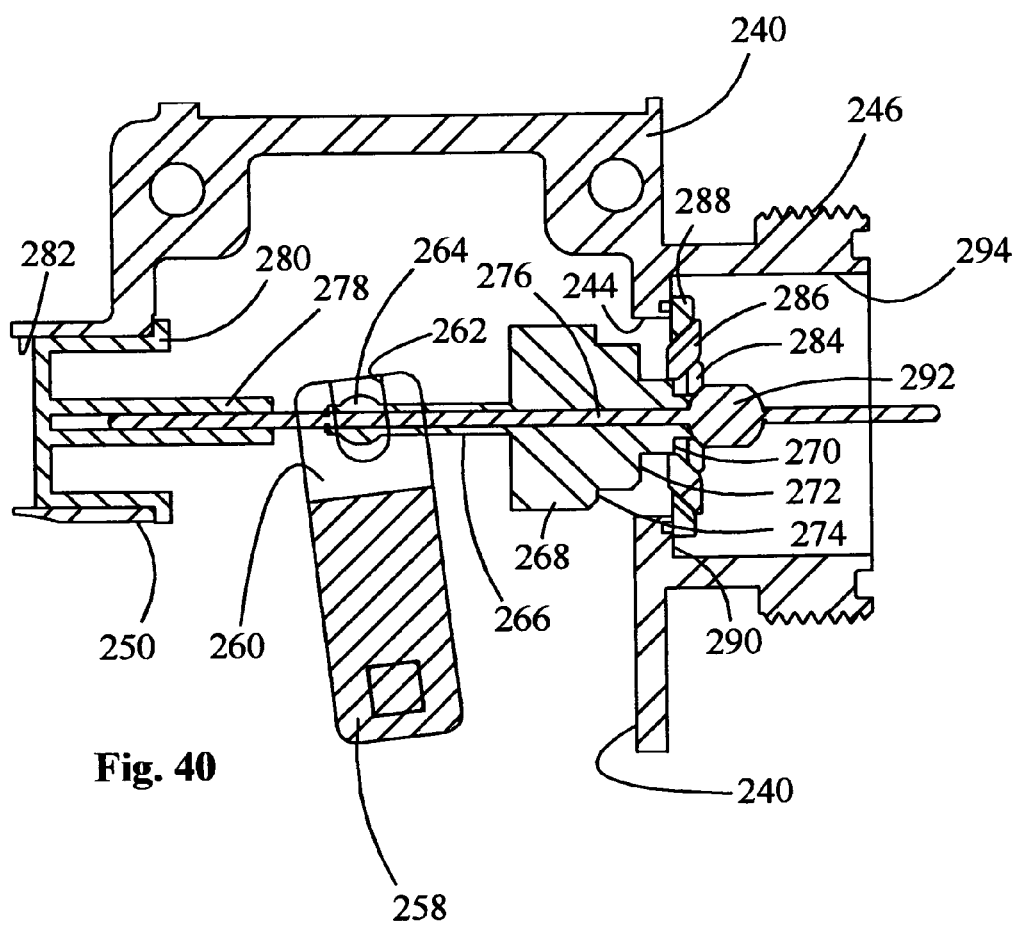
FIG. 40 is a top plan cross-sectional view of the flow control valve of FIGS. 38 and 39 showing the valve in a fully closed position.
Figure 41:
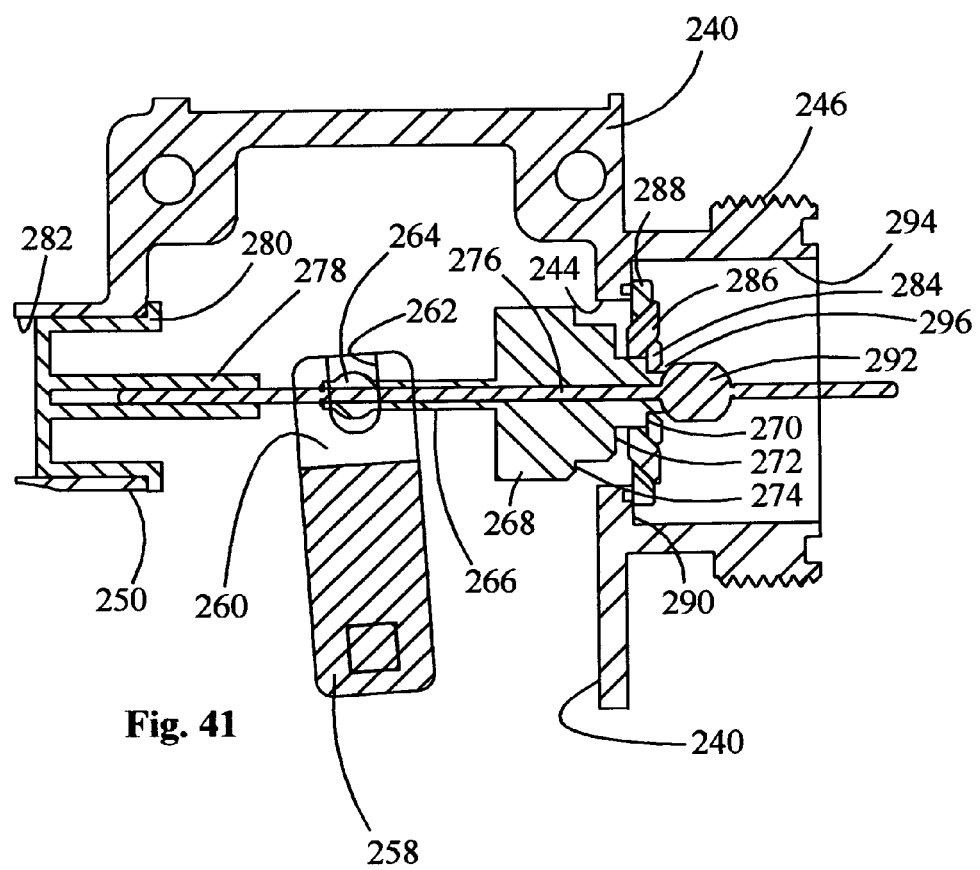
FIG. 41 is a view similar to FIG. 40 showing the flow control valve in a first partially open position.
Figure 42:
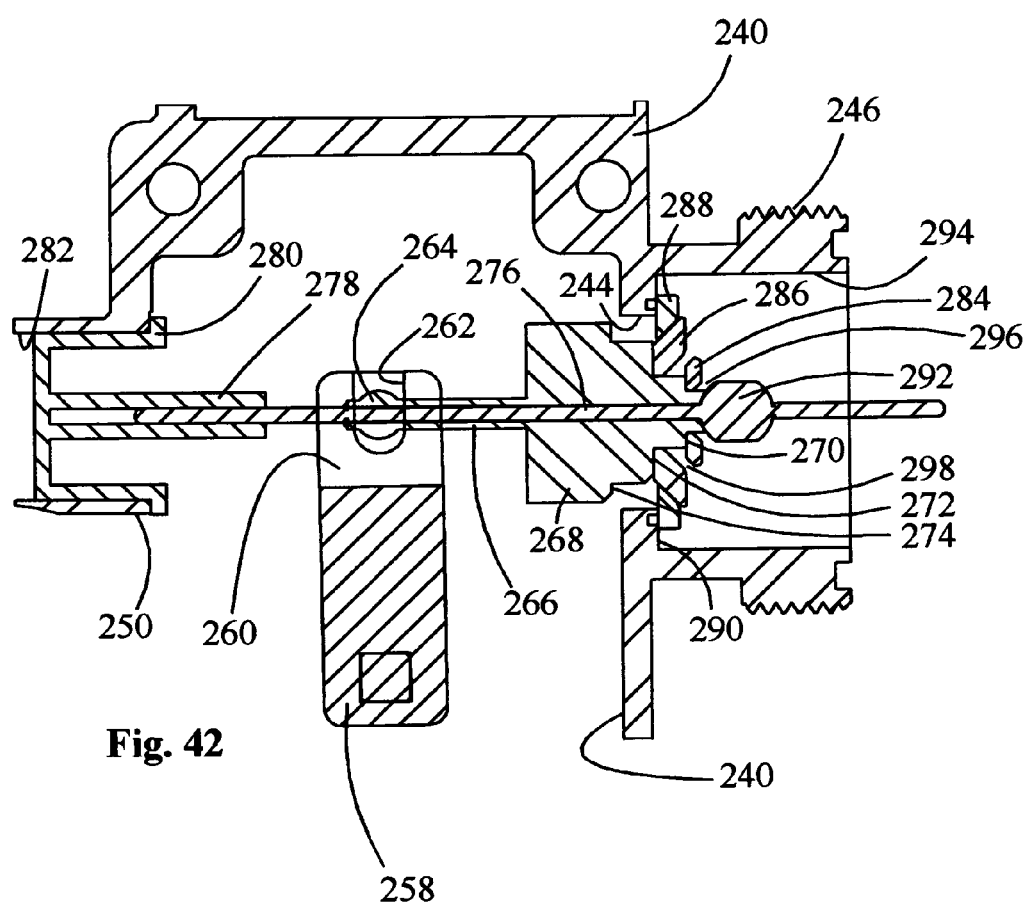
FIG. 42 is a view similar to FIG. 40 showing the flow control valve in a second partially open position.
Figure 43:
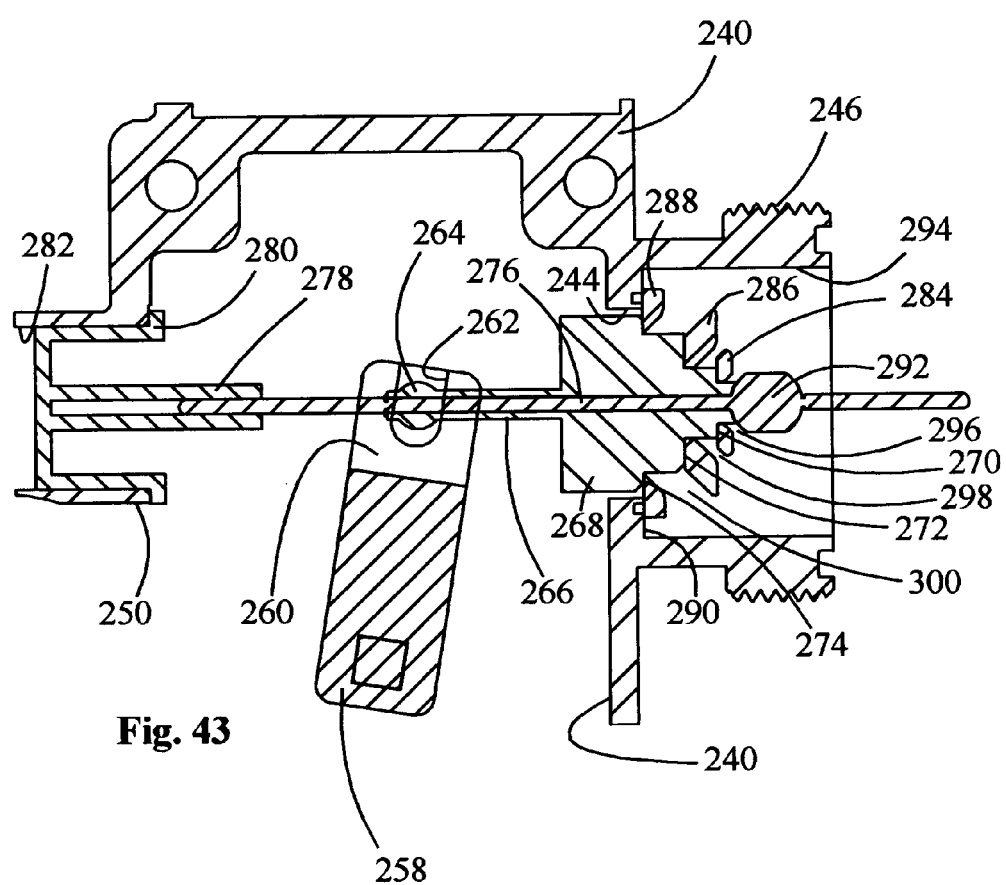
FIG. 43 is a view similar to FIG. 40 showing the flow control valve in a third partially open position.
Figure 44:
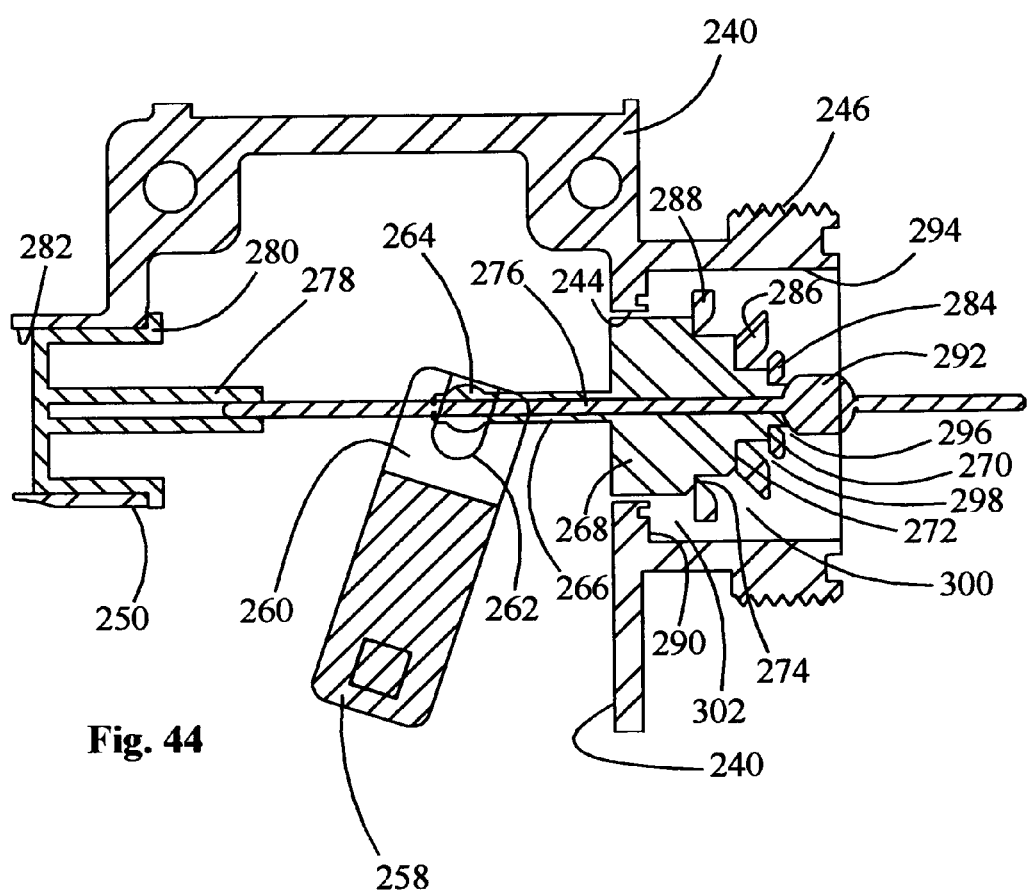
FIG. 44 is a view similar to FIG. 40 showing the flow control valve in the completely open position.

When the water pressure within internal chamber 242 is approximately equal to or less than the water pressure in inlet chamber 294 which connects to supply line 60, the wafer 288 is tightly sealed against wall surface 290, wafer 286 is tightly sealed against wafer 288, wafer 284 is tightly sealed against wafer 286 and plug 292 is tightly sealed against wafer 284. Water flow into internal chamber 242 is prevented. If a slight drop in pressure occurs in internal chamber 242, such will be determined by the pressure sensor 166 and the electronics on mother board 168 that there is a leak. In this instance, the flow control valve (244, 268, 276, 284, 286, 288, 292), and the wafer valve formed by wafers 284, 286, 288, and plug 292 will remain closed as is shown in FIG. 40.

Now if there is a rapid drop in pressure in internal chamber 242 as would occur if a faucet is turned on in building structure 50, the motor is activated which will pivot arm 258 clockwise. Plug 292 will first become unseated and will thereby open gap 296 creating a first partially open position (FIG. 41), which will start water flow into internal chamber 242. Next wafer 284 will become unseated from wafer 286 by step 270 causing wafer 284 to move, and creating a second partially open position (FIG. 42), which lets a greater volume of water flow into internal chamber 242 through gap 298. Then wafer 286 will be moved by step 272 and become unseated, creating a third partially open position (FIG. 43), which will cause a still greater volume of water to flow through gap 300. Lastly when step 274 causes wafer 288 to become unseated, then the flow control valve (244, 268, 276, 284, 286, 288, 292) is totally open (FIG. 44) and maximum flow occurs into internal chamber 242 through gaps 296, 298, 300, and 302.

This sequential opening arrangement is to counter the water pressure being applied to the wafer valve at the inlet chamber 294 by gradually opening the valve. If the valve assembly didn't open gradually, a substantial amount of force would be necessary which would require a larger motor.

A timer (not shown) is to be used in conjunction with this apparatus. The timer will be included with the software which is programmed into mother board 168. The timer can be set to any desired time internal. If a pipe or connecting line breaks and fast flow of water occurs, the apparatus will "read" this break as a faucet has been turned fully on which would be normal usage. However, this flow will only be permitted for a preset period of time after which the valve will be closed and flow stopped. This will minimize damage due to the break. If the flow is actually desired, the user only needs to push button 216 which will reset the timer and permit flow to continue.

Since a major function of the fluid leak detector apparatus and regulators 62, 238 is to protect a structure plumbing system from excessive pressures, the electronics would be set at an "operating pressure level". This level should be at least 4 psi below the average pressure observed on the inlet supply side of the regulator 62 and/or regulator 238 at the time of installation. Then the "maximum pressure" menu screen is programmed while the flow control valves, comprised of piston 80 and cylinder 84 (FIGS. 6 to 29) or wafer valve (FIGS. 38 to 44), is in the normally closed position. The fluid leak detector apparatus will during operation look at the pressure readings from the pressure sensor 166 and adjust the pressure to within plus or minus 4 psi of the set operating pressure if needed. If the pressure sensor 166 detects a rise beyond the set amount "plus or minus window", a signal will be sent to the motor 150 to open the flow control valve (80, 82, 84), (244, 268, 276, 284, 286, 288, 292) and let the excess pressure escape back to the water supply line 60. If after the flow control valve is opened and the pressure does not subside, the electronics will send a signal to close the flow control valve and open the bleed valve (126, 140, 146). If after this sequence the pressure sensor 166 still reads high pressure, the electronics will send a signal to the wireless remote 206 to turn on the warning status LED light, display the message "problem detected" and sound an alarm. A notification will also be sent to the user that a problem has been detected with the system. If the sensor 166 and electronics detect a situation where the static pressure is below the set pressure window of plus or minus 4 psi, the same message and alarm occurs as above noted. When water freezes within the closed plumbing system, the pressure will rise from the expansion created by the formation of ice. The pressure sensor 166 and electronics will detect this rise in pressure and a signal will be sent to the motor 150 to perform the necessary operations to open the bleed valve (126, 140, 146). As a backup, the electronics is equipped with a temperature sensor that will also energize the bleed valve (126, 140, 146) when the temperature that is programmed into the "freeze protection" menu is reached.

Since the flow control and bleeds valves are normally closed and the pressure sensor 166 is always looking for even the smallest decrease in pressure, the fluid leak detection apparatus is continuously watching the plumbing system to detect leaks. The electronics does this by watching for pressure drops over a certain period of time. If the sensor 166 detects a gradual drop in pressure of less than 4 psi over a period of one hour, the electronics will activate lights and or buzzers on one or more of the housings and also display a message alert on the display screen 180 to notify the user of a potential leak. Since the flow control and bleed valves are already closed, nothing else needs to be done. If there is indeed a leak, the pressure will continue to drop but since the valves are closed, and the leaking water will not be replaced. Since the pressure during a leak condition is dropping, the rate of water being forced out the leak will also continue to decrease. When most of the pressure has been depleted from the system due to the leak, the electronics will lock the valves if programmed to do so, and will activate appropriate annunciators (light(s), alarm(s) and message(s)). Once the electronics locks out the valves, it will not open the valves even if the sensor detects a sudden 7 psi drop in pressure which is the normal trigger signal. The locked out valves can only be unlocked with the reset button on the control units 170, 204 or wireless remote 206. If the user wishes, this feature can be deactivated and the flow control and bleed valves will open as previously described, and for example, at any time the appropriate 7 psi drop signal is recorded. If the "dual mode" feature is activated, the above sequence of events will remain the same except that the flow control valve will now be in the open position and the trigger signal will start the timer when the appropriate signal is received. All functions remain the same. The "duration time" setting is programmed into the electronics and permits "access to water" for a continuous amount of time. The desired amount of time is programmed and the sensor 166 continuously looks for sudden drops in water pressure. When a sudden drop of 7 psi is detected, a signal is sent from the sensor 166 to the electronics and the timer and finally to the motor 150 to open the flow control valve (80, 82, 84), (244, 268, 276, 284, 286, 288, 292) and allow water flow. As the timer counts down the minutes, the water conservation circuit will become active and accept inputs from the sensor 166, paddle wheel 156 and timer. The electronics will send signals to the motor 150 to partially close and/or close the flow control valve (80, 82, 84), (244, 268, 276, 284, 286, 288, 292) to regulate both pressure and flow as needed. The fluid leak detector apparatus can be programmed so that the signals will be sent based on a pre-programmed profile to the flow control valve (80, 82, 84), (244, 268, 276, 284, 286, 288, 292) to raise and lower the water pressure and flow. Ideally the user can reduce pressure in a manner as to be nearly not noticed and over an extended period of time realize a substantial reduction in water consumption and reap meaningful savings. If at any time during the countdown of the timer, the pressure sensor 166 detects a return to within plus or minus 4 psi of the set pressure, the timer will reset and the flow control valve will remain open until the time expires. When the timer reaches a "2 minute warning" it will cause the motor 150 to retract the flow control valve to lower the pressure to 15 psi for three seconds before reopening the flow control valve fully. If immediately after the 2 minute warning signal the pressure returns to within plus or minus 4 psi of the preset level, the timer resets and a new countdown commences. This cycle will continue every time a pressure increase to within plus or minus 4 psi of the preset level is detected while in the "Z minute warning". This feature will allow users to reset the timer without having to depress the reset button on the units 170, 204 or 206. If the sensor does not see the pressure rise to within the plus or minus 4 psi of the preset level immediately after the "2 minute warning", the timer will continue to countdown and when time has expired, close the flow control valve. The electronics will then send off the notification of "leak detected" to be displayed on screen 180 and turn on the warning status light on the units.

Entering a "time slot" into the "timeout period" menu of the electronics will put the timer in sleep mode for the chosen period of time. There can be multiple time periods per day that can be designated as a "timeout period". If the sensor detects a pressure drop the motor 150 will open the flow control valve and leave it open for the entire "time slot". The water conservation program is also disabled during the "timeout period" and can only be active when the timer is active.

Even though the system is always watching for sudden pressure drops and slow drops, the system can be programmed to manually or automatically run a "system test" anytime the user wishes. By selecting the "manual test" mode or programming a time into the "system test" menu the unit will first verify that the flow control and bleed valves are in the closed position and look at the pressure sensor to verify pressure. It will then monitor the pressure for a certain period of time and look for pressure drops. A signal will then be sent to the motor 150 to open the bleed valve (126, 140, 146) and look for a rapid drop in pressure of 7 psi or greater. Once this drop is verified, it will close the bleed valve (126, 140, 146) and open the flow control valve (80, 82, 84), (244, 268, 276, 284, 286, 288, 292) to restore building structure pressure. Once the pressure sensor verifies that pressure has risen, a signal will be sent to close the flow control valve (80, 82, 84), (244, 268, 276, 284, 286, 288, 292) and send an "OK" signal to display screen 180. If a pressure drop is not detected when the bleed valve (126, 140, 146) is opened it will send the message "bleed valve stuck". If only a small drop in pressure is detected when the bleed valve (126, 140, 146) is opened it will send the message "bleed valve failure" and it will be displayed on the screen 180 and turn on the alarm and warning lights on the units 170, 204 and 206. This test can be programmed to run multiple times a day. If at any time a leak is detected by any person, the "panic button" 200 can be pressed-to instantly close the flow control and bleed valves.

The invention claimed is:

1. A fluid leak detector apparatus connected to a liquid supply conduit which is to supply liquid to a closed liquid system, comprising:
   a flow control valve having a cylinder having an internal through bore;
   said flow control valve also having a piston mounted within said through bore and the cylinder adapted to move relative to the piston from a first position to a second position, said first position not permitting flow of fluid through said valve, said second position permitting flow of fluid through said valve;
   a regulator connected to said valve, said regulator to be operable to affect relative movement of said cylinder, said regulator locates said valve in said first position when in its default position.

2. The apparatus as defined in claim 1 wherein:
said piston having a series of tapered prongs telescopingly received within said cylinder.

3. The apparatus as defined in claim 1 wherein:
said regulator including a bleed valve to discharge fluid into an ambient when there is fluid pressure above an operating pressure level within said regulator.

4. The apparatus as defined in claim 1 wherein:
said regulator includes a fluid flow measuring device to ascertain an amount of fluid flowing through said regulator.

5. The apparatus as defined in claim 4 wherein:
said measuring device comprising a paddle wheel on which is mounted at least one magnet, said magnet to move in close proximity to a sensor which will be used to calculate the amount of fluid passing through said regulator.

6. The apparatus as defined in claim 1 wherein:
said regulator including a fluid pressure sensor which supplies pressure readings to a mechanism which controls the movement of said valve between said first position and said second position.

7. The apparatus as defined in claim 6 wherein:
said mechanism includes a linkage assembly which is connected to said cylinder to cause movement of said cylinder relative to said piston, said mechanism includes a motor which is connected to said linkage assembly to affect movement of such.

8. The apparatus as defined in claim 3 wherein:
said regulator includes a linkage assembly which is connected to said bleed valve to open said bleed valve.

9. The apparatus as defined in claim 1 wherein:
said regulator having an internal chamber through which flow of fluid is to occur, said internal chamber being continuously connected to a building structure fluid supply conduit so that pressure of the fluid in said fluid supply conduit is also conducted into said internal chamber, said regulator being connected to a controller which has electronics, upon a leak occurring such will be detected by a gradual drop in pressure within said internal chamber and said flow control valve will remain closed.

10. The apparatus as defined in claim 9 wherein:
said controller to read a pressure level of the fluid within said building structure supply conduit, if a drop in the read pressure occurs within said building structure said fluid supply conduit and said regulator will cause said flow control valve to open, said regulator will then look for fluctuations in the pressure and if no fluctuations occur will then cause said flow control valve to close.

11. The apparatus as defined in claim 10 wherein:
said regulator connected to a control panel, said control panel having a manual override button which when activated will move said cylinder into said first position.

12. A liquid supply conduit which is to supply liquid to a liquid system, a regulator for reading a pressure of the liquid within said closed liquid system, said pressure to be set to a desired level, upon the pressure exceeding said desired level a bleed valve mounted on said regulator is opened to discharge liquid into an ambient, upon the pressure being lower than the desired level, a flow control valve within said regulator is movable from a closed position to an open position whereupon liquid from said liquid supply conduit flows into said dosed liquid system to increase the pressure therein;
upon a leak occurring within said closed liquid system a pressure drop will be sensed by said regulator which causes said flow control valve to remain closed to terminate the leak;
a linkage assembly is connected to said flow control valve, said linkage assembly to affect movement of said flow control valve between said closed position and said open position; and
said linkage assembly also connecting with said bleed valve, when said bleed valve is opened said flow control valve is closed, when said flow control valve is opened said bleed valve is closed.

13. A liquid supply conduit which is to supply liquid to a liquid system, a regulator for reading a pressure of the liquid within said closed liquid system, said pressure to be set to a desired level, upon the pressure exceeding said desired level, a bleed valve mounted on said regulator is opened to discharge liquid into an ambient, upon the pressure being lower than the desired level, a flow control valve within said regulator is movable from a closed position to an open position whereupon liquid from said liquid supply conduit flows into said dosed liquid system to increase the pressure therein;
upon a leak occurring within said closed liquid system a pressure drop will be sensed by said regulator which causes said flow control valve to remain closed to terminate the leak;
said regulator having an enclosed housing defining an internal chamber, said bleed valve connecting with said internal chamber, said flow control valve is mounted within said internal chamber; and
said flow control valve comprises a piston received within a cylinder adapted to move relative to the piston, said piston includes ports which are open to said internal chamber when said flow control valve is located in said open position permitting flow of liquid into said internal chamber.

* * * * *